United States Patent
Xiong et al.

(10) Patent No.: US 10,142,064 B2
(45) Date of Patent: Nov. 27, 2018

(54) TECHNIQUES AND CONFIGURATIONS ASSOCIATED WITH MACHINE TYPE COMMUNICATION IN ENHANCED COVERAGE MODE

(71) Applicant: Intel IP Corporation, Santa Clara, CA (US)

(72) Inventors: Gang Xiong, Beaverton, OR (US); Seunghee Han, Cupertino, CA (US); Jong-Kae Fwu, Sunnyvale, CA (US)

(73) Assignee: Intel IP Corporation, Santa Clara, CA (US)

( * ) Notice: Subject to any disclaimer, the term of this patent is extended or adjusted under 35 U.S.C. 154(b) by 495 days.

(21) Appl. No.: 14/479,825

(22) Filed: Sep. 8, 2014

(65) Prior Publication Data

US 2015/0078224 A1    Mar. 19, 2015

Related U.S. Application Data

(60) Provisional application No. 61/933,869, filed on Jan. 30, 2014, provisional application No. 61/883,127, (Continued)

(51) Int. Cl.
| | |
|---|---|
| H04L 1/18 | (2006.01) |
| H04B 1/50 | (2006.01) |
| H04L 5/00 | (2006.01) |
| H04W 4/70 | (2018.01) |
| H04L 5/14 | (2006.01) |

(52) U.S. Cl.
CPC .......... *H04L 1/1887* (2013.01); *H04B 1/50* (2013.01); *H04L 1/189* (2013.01); *H04L 1/1858* (2013.01); *H04L 1/1896* (2013.01); *H04L 5/0055* (2013.01); *H04L 5/1469* (2013.01); *H04W 4/70* (2018.02); *Y02D 70/20* (2018.01)

(58) Field of Classification Search
None
See application file for complete search history.

(56) References Cited

U.S. PATENT DOCUMENTS

| | | | |
|---|---|---|---|
| 2010/0260081 A1 | 10/2010 | Damnjanovic et al. | |
| 2013/0083753 A1* | 4/2013 | Lee ................... | H04W 72/0453 370/329 |

(Continued)

FOREIGN PATENT DOCUMENTS

| | | |
|---|---|---|
| CN | 101026799 A | 8/2007 |
| CN | 103209062 A | 7/2013 |

OTHER PUBLICATIONS

U.S. Appl. No. 61/858,633 provisional application (orginal) of published parent patent application (US 2016/0143017) (Year: 2013).*

(Continued)

*Primary Examiner* — Yaotang Wang
(74) *Attorney, Agent, or Firm* — Schwabe, Williamson & Wyatt, P.C.

(57) ABSTRACT

Embodiments of the present disclosure describe systems and methods for enhanced coverage machine type communication (MTC). Various embodiments may include systems and methods for scheduling a starting subframe, timing sequence, or resource for various transmissions with repetition to achieve a coverage extension target for MTC. Other embodiments may be described and/or claimed.

8 Claims, 7 Drawing Sheets

Related U.S. Application Data filed on Sep. 26, 2013, provisional application No. 61/879,014, filed on Sep. 17, 2013.

(56) References Cited

U.S. PATENT DOCUMENTS

| | | | |
|---|---|---|---|
| 2014/0022963 A1* | 1/2014 | Yang | H04L 5/0055 370/280 |
| 2014/0233469 A1* | 8/2014 | Seo | H04L 5/001 370/329 |
| 2014/0362796 A1* | 12/2014 | Seo | H04L 1/1854 370/329 |
| 2015/0098418 A1* | 4/2015 | Vajapeyam | H04L 1/1896 370/329 |
| 2016/0143017 A1* | 5/2016 | Yang | H04W 4/005 370/329 |
| 2016/0211949 A1* | 7/2016 | You | H04W 4/70 |

OTHER PUBLICATIONS

U.S. Appl. No. 61/858,633 provisional application (translated) of published parent patent application (US 2016/0143017) (Year: 2015).*

International Search Report and Written Opinion of the International Searching Authority for PCT/US2014/055848, dated Dec. 24, 2014, 14 pages.

ZTE, "Discussion on Repetition for Control Channel and Traffic Channel", R1-133062, 3GPP TSG RAN WG1 Meeting #74, Barcelona, Spain, Aug. 19-23, 2013, 9 pages.

Alcatel-Lucent, et al., "Coverage enhancement for (E)PDCCH", R1-132973, 3GPP TSG RAN WG1 Meeting #74, Barcelona, Spain, Aug. 19-23, 2013, 2 pages.

Alcatel-Lucent, et al., "(E)PDCCH coverage extension for MTC devices," R1-130941, 3GPP TSG-RAN WG1 Meeting #72bis, Chicago, IL, USA, Apr. 15-19, 2013, 4 pages.

Samsung, "Coverage Enhancements for MTC UEs", R1-133100, 3GPP TSG RAN WG1 Meeting #74, Barcelona, Spain, Aug. 19-23, 2013, 6 pages.

Alcatel-Lucent, et al., "On SORTD for PUCCH Format 1b with channel selection", R1-122467, 3GPP TSG RAN WG1 Meeting #69, Prague, Czech Republic, May 21-25, 2012, 4 pages.

CATT, "PUCCH resource for E-PDCCH," R1-124107, 3GPP TSG RAN WG1 Meeting #70bis, San Diego, CA, USA, Oct. 8-12, 2012, 3 pages.

Intel Corporation, "Coverage Improvement for PCFICH and PHICH," 3GPP TSG RAN WG1 Meeting #76, R1-140117, Agenda item: 7.2.2.2.6, Feb. 10-14, 2014, Prague, Czech Republic, 6 pages.

Intel Corporation, "Coverage Improvement for (E)PDCCH and PUCCH," 3GPP TSG RAN WG1 Meeting #76, R1-140116, Agenda item: 7.2.2.2.3, Feb. 10-14, 2014, Prague, Czech Republic, 7 pages.

Extended European Search Report dated Jul. 28, 2017 for Patent Application No. 14845174.3; 13 pages.

European Patent Office; Partial Supplementary European Search Report dated Apr. 26, 2017 for Patent Application No. 14845174.3; 15 pages.

Chinese Patent Office—First Office Action dated Feb. 24, 2018 from Chinese Patent Application No. 201480045640.2, 6 pages.

\* cited by examiner

TECHNIQUES AND CONFIGURATIONS ASSOCIATED WITH MACHINE TYPE COMMUNICATION IN ENHANCED COVERAGE MODE

CROSS-REFERENCE TO RELATED APPLICATION

This application claims the benefit of U.S. Provisional Application No. 61/879,014 filed Sep. 17, 2013, entitled "ADVANCED WIRELESS COMMUNICATION SYSTEMS AND TECHNIQUES;" U.S. Provisional Application No. 61/883,127 filed Sep. 26, 2013, entitled "ADVANCED WIRELESS COMMUNICATION SYSTEMS AND TECHNIQUES;" and U.S. Provisional Application No. 61/933,869 filed Jan. 30, 2014, entitled "ON UPLINK HARQ TIMING FOR MTC UES IN ENHANCED COVERAGE MODE." The entirety of the above listed applications is hereby incorporated reference.

FIELD

Embodiments of the present disclosure generally relate to the field of wireless communication, and more particularly, to machine type communication in enhanced coverage mode.

BACKGROUND

The background description provided herein is for the purpose of generally presenting the context of the disclosure. Unless otherwise indicated herein, the materials described in this section are not prior art to the claims in this application and are not admitted to be prior art by inclusion in this section.

Machine-Type Communication (MTC) is a promising and emerging technology. Potential MTC based applications include smart metering, healthcare monitoring, remote security surveillance, intelligent transportation system, etc. These services and applications stimulate the design and development of a new type of MTC device that may need to be integrated into current and next generation mobile broadband networks such as LTE and LTE-Advanced.

The existing mobile broadband networks were designed to optimize performance mainly for human type of communications and thus are not optimized for MTC specific requirements. For instance, some MTC devices may be installed in basements of residential buildings. These devices may experience significantly greater penetration losses on the radio interface than normal LTE devices. In order to provide sufficient coverage of such MTC devices, special coverage enhancement considerations may be needed for various physical channels.

BRIEF DESCRIPTION OF THE DRAWINGS

Embodiments will be readily understood by the following detailed description in conjunction with the accompanying drawings. To facilitate this description, like reference numerals designate like structural elements. Embodiments are illustrated by way of example and not by way of limitation in the figures of the accompanying drawings.

DETAILED DESCRIPTION

Figure 1:
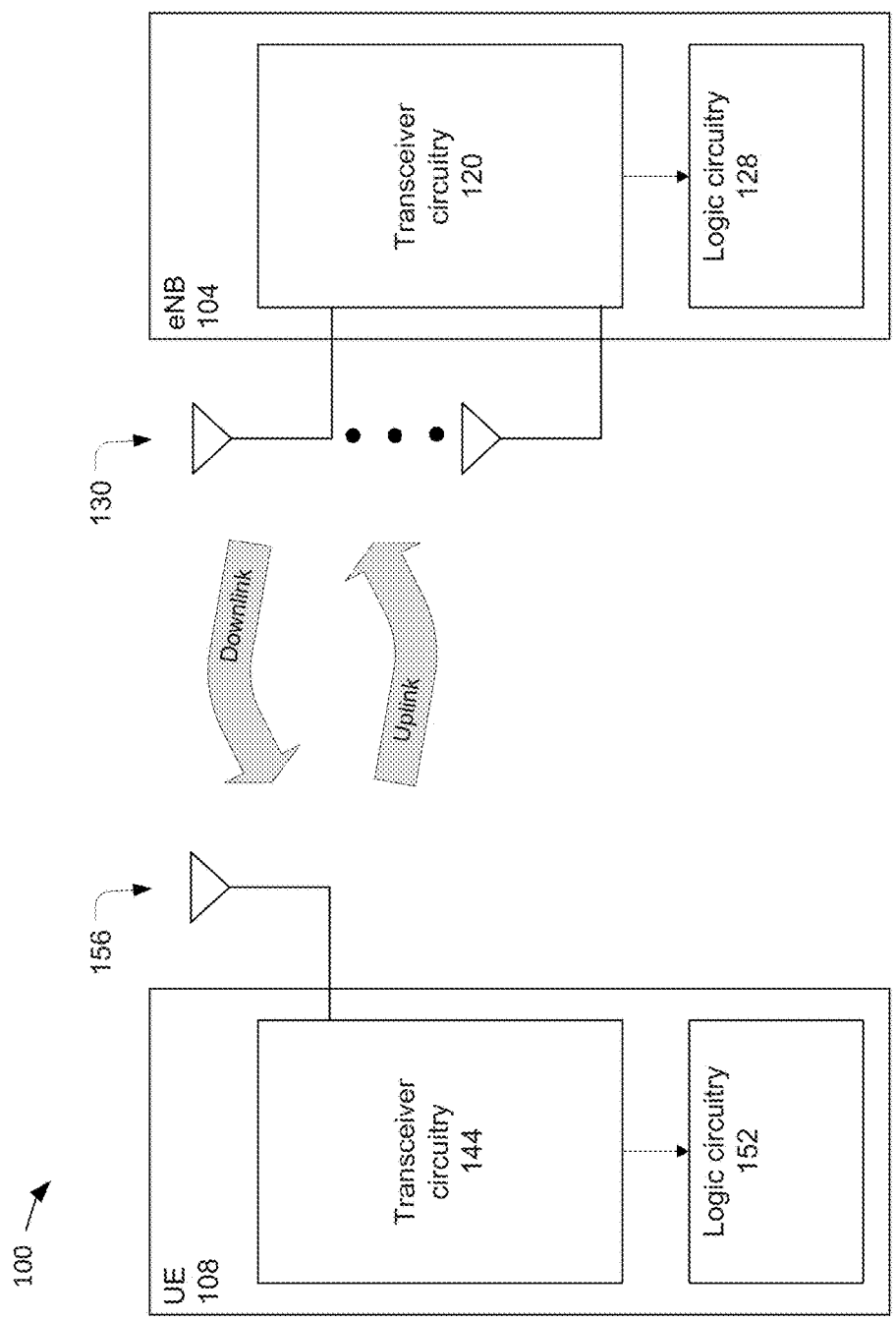
FIG. 1 schematically illustrates a wireless communication environment in accordance with various embodiments of the present disclosure.

In the following detailed description, reference is made to the accompanying drawings, which form a part hereof wherein like numerals designate like parts throughout, and in which is shown by way of illustration embodiments that may be practiced. It is to be understood that other embodiments may be utilized and structural or logical changes may be made without departing from the scope of the present disclosure.

Various operations may be described as multiple discrete actions or operations in turn, in a manner that is most helpful in understanding the claimed subject matter. However, the order of description should not be construed as to imply that these operations are necessarily order dependent. In particular, these operations may not be performed in the order of presentation. Operations described may be performed in a different order than the described embodiment. Various additional operations may be performed and/or described operations may be omitted in additional embodiments.

For the purposes of the present disclosure, the phrase "A and/or B" means (A), (B), or (A and B). For the purposes of the present disclosure, the phrase "A, B, and/or C" means (A), (B), (C), (A and B), (A and C), (B and C), or (A, B, and C). The description may use the phrases "in an embodiment," or "in embodiments," which may each refer to one or more of the same or different embodiments. Furthermore, the terms "comprising," "including," "having," and the like, as used with respect to embodiments of the present disclosure, are synonymous.

As used herein, the term "circuitry" may refer to, be part of, or include an Application Specific Integrated Circuit (ASIC), an electronic circuit, a processor (shared, dedicated, or group), and/or memory (shared, dedicated, or group) that execute one or more software or firmware programs, a combinational logic circuit, and/or other suitable hardware components that provide the described functionality.

As discussed above, to provide sufficient coverage of MTC devices, special coverage enhancement considerations may be needed for various physical channels. These coverage enhancements may include a desired coverage enhancement target for various physical channels of communication. For example, in some instances physical uplink channels and physical downlink channels such as, physical downlink control channel (PDCCH), physical hybrid-automatic repeat request (HARD) indicator channel (PHICH), physical uplink shared channel (PUSCH), etc. may be configured to achieve a desired gain in signal power, or decibel (dB) gain. As used herein, including the claims, PDCCH includes enhanced PDCCH (EPDCCH).

One method of achieving such a gain in signal power is through repetition of a signal to reach the desired gain in signal power, hereinafter referred to as "signal gain." The individual repetitions may work to build the signal to the desired level of signal gain wherein each individual repetition contributes to the resulting overall signal gain. Because it may be necessary to repeat signals to achieve a desired signal gain, timing requirements and resources for the individual transmissions may need to be adjusted to enable the repetition and avoid transmission collisions.

As discussed herein, a period of time may be referred to as a frame, subframe, or slot. A frame refers to a period of time spanning 10 milliseconds (ms). Each frame may be composed of 10 subframes, each subframe spanning 1 ms. Each subframe may be composed of two slots, each slot spanning 0.5 ms.

In order to achieve the above discussed signal gain, a transmission carrying information that may normally span 1 subframe, or 1 ms, may need to be repeated 'n' times where 'n' may be any positive number. The additional n−1 frames may cause issues with a later scheduled transmission that may need to utilize the information carried by the transmission or may be scheduled on the same resource during the repetition of the transmission. As a result, timing and/or resource allocation of these transmissions with repetition may need to be adjusted to account for repetition of individual transmissions.

FIG. 1 schematically illustrates a wireless communication environment 100 in accordance with various embodiments. The environment 100 may include a user equipment (UE) 108 in wireless communication with an access node such as evolved node B (eNB) 104. The eNB 104 may be part of a 3rd Generation Partnership Project (3GPP) long-term evolution (LTE) network (or an LTE-Advanced (LTE-A) network). In particular, the eNB 104 may be part of a radio access network (RAN) of the LTE/LTE-A network, such as an evolved universal terrestrial radio access network (E-UTRAN). The E-UTRAN may be coupled with a core network such as an Evolved Packet Core (EPC) that performs various management and control functions of the LTE/LTE-A network and further provides a communication interface between various RANs and other networks.

eNB 104 may include transceiver circuitry 120 with which to receive uplink transmissions from UE 108 via one or more antennas 130 and transmit downlink transmissions to UE 108 via the one or more antennas 130. eNB 104 may also include logic circuitry 128 coupled with transceiver circuitry 120. In embodiments logic circuitry 128 may be configured to decode and encode information transmitted in signals communicated between UE 108 and eNB 104. Logic circuitry may further be configured to perform any portion of the processes described below in reference to FIGS. 2-6.

UE 108 may include transceiver circuitry 144, logic circuitry 152, and antenna 156. While depicted as a single antenna in this embodiment, in other embodiments antenna 156 may be any number of antennas. Transceiver circuitry 144 may be coupled with antenna 156 to receive downlink transmission from eNB 104 and transmit uplink transmissions to eNB 104. Logic circuitry 152 may be coupled to transceiver circuitry 144, and may be configured to decode and encode information transmitted in signals communicated between the UE 108 and the eNB 104. Logic circuitry may further be configured to perform any portion of the processes described below in reference to FIGS. 2-6.

Figure 2:
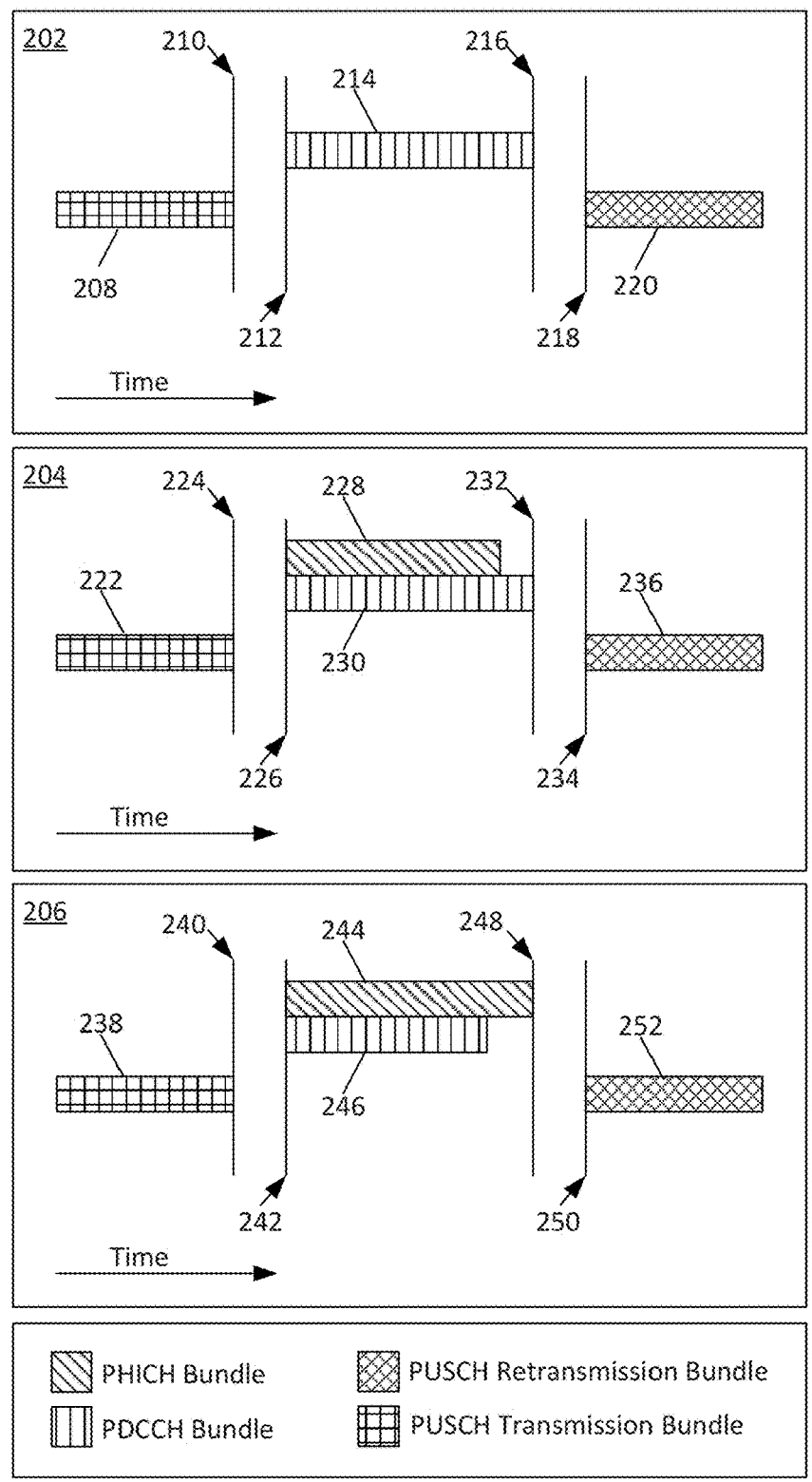
FIG. 2 illustrates timing of a physical uplink shared channel (PUSCH) retransmission in accordance with various embodiments of the present disclosure.

FIG. 2 illustrates timing of a physical uplink shared channel (PUSCH) retransmission by a user equipment (UE) (e.g., UE 108 of FIG. 1) in response to a hybrid automatic repeat request (HARM) negative acknowledgment (NACK) downlink transmission from an eNodeB (eNB) (e.g., eNB 104 of FIG. 1), in accordance with various embodiments of the present disclosure. Each of blocks 202-206 depicts a sequence of transmissions between the UE and the eNB over a sequence of time depicted by the horizontal axis. In embodiments, the UE may be a machine type communication (MTC) UE operating in an enhanced coverage mode, which may require repetition of transmissions across any number of subframes to achieve a desired signal gain.

The sequence of transmissions depicted by block 202 may begin with a PUSCH transmission, depicted by PUSCH transmission bundle 208, carrying data from the UE to the eNB. PUSCH transmission bundle 208 may depict any number of repetitions of a PUSCH transmission to achieve the desired signal gain. The PUSCH transmission bundle 208 may complete transmission at time 210. Once transmission of PUSCH transmission bundle 208 completes, the eNB that receives the PUSCH transmission bundle may need a period of time to process the PUSCH transmission bundle. Such a period of time is depicted by the time period between time 210 and time 212. In some embodiments, the time period between time 210 and time 212 may be a predefined period time to allow for scheduling of later transmissions. For example, in frequency division duplex (FDD) systems the predefined period of time may be four subframes and in time division duplex (TDD) systems the predefined period of time may be k1 where k1 is determined in accordance with Table 1, below. In other words, if time 210 corresponds with subframe 'n,' then time 212 may, in FDD systems, correspond with subframe n+4, and in TDD systems may correspond with n+k1.

TABLE 1 k1 for TDD configurations 0-6

| TDD UL/DL | subframe index n | | | | | | | | | |
|---|---|---|---|---|---|---|---|---|---|---|
| Configuration | 0 | 1 | 2 | 3 | 4 | 5 | 6 | 7 | 8 | 9 |
| 0 | | | 4 | 7 | 6 | | | 4 | 7 | 6 |
| 1 | | | 4 | 6 | | | | 4 | 6 | |
| 2 | | | 6 | | | | | 6 | | |
| 3 | | | 6 | 6 | 6 | | | | | |
| 4 | | | 6 | 6 | | | | | | |
| 5 | | | 6 | | | | | | | |
| 6 | | | 4 | 6 | 6 | | | | 4 | 7 |

Table 1 depicts k1 for each downlink (DL) subframe of various TDD uplink/downlink (UL/DL) configurations. The various TDD UL/DL configurations are depicted by Table 2, below, where 'D' indicates DL data is transmitted in the corresponding subframe, 'U' indicates UL data is transmitted in the corresponding frame, and 'S' indicates that special fields, downlink pilot time slot (DwPTS), guard period (GP) and uplink pilot timeslot (UpPTS), are transmitted in the corresponding frame.

TABLE 2

UL/DL Configurations for TDD

| UL/DL Configuration | DL-to-UL Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

Once PUSCH transmission bundle 208 is processed by the eNB, the eNB may send a downlink transmission to the UE including a hybrid automatic repeat request (HARQ) acknowledgement (ACK) indicating that the PUSCH transmission was successfully received or a negative acknowledgement (NACK) indicating that the PUSCH transmission was not successfully received. In some embodiments, the HARQ-ACK/NACK indicator may be sent to the UE via a physical downlink control channel (PDCCH) transmission and/or a physical HARQ indicator channel (PHICH) transmission. As depicted in block 202, the HARQ-ACK/NACK may be sent, in some instances, via a PDCCH transmission alone (e.g., PDCCH bundle 214). Such an instance may occur, for example, where PHICH transmissions are not be supported.

PDCCH bundle 214 may depict any number of repetitions of a PDCCH transmission to achieve the desired signal gain. The PDCCH bundle 214 may complete transmission at time 216. Once transmission of PDCCH bundle 214 completes, the UE that receives PDCCH bundle 214 may need a period of time to process the PDCCH bundle. Such a period of time is depicted by the time period between time 216 and time 218.

In embodiments, where PDCCH bundle 214 is carrying a HARQ-NACK indicator, the UE may need to determine a subframe in which the UE may begin transmission of PUSCH retransmission bundle 220 to the eNB. The eNB may in turn need to be able to determine the subframe in which the eNB is to begin receipt of PUSCH retransmission bundle 220 in order to know when to begin processing PUSCH retransmission bundle 220. As such, the time period between time 216 and time 218 may be a predefined period of time (e.g. four subframes in FDD or k2 subframes in TDD, where k2 is determined in accordance with Table 3) to allow for scheduling of the transmission of PUSCH retransmission bundle 220. In other words, for FDD, if time 216 corresponds with subframe n+4+RL, where RL is the repetition level associated with the PDCCH transmission to achieve the desired signal gain, then time 218 may, in some embodiments, correspond with subframe n+4+RL+4, which may be simplified to n+8+RL. For TDD, time 218 may correspond with subframe n+k1+k2+RL, utilizing the same analysis, where k1 and k2 is determined in accordance with Table 1 and Table 3, respectively, as discussed herein.

TABLE 3 k2 for TDD configurations 0-6

| TDD UL/DL Configuration | subframe number n | | | | | | | | | |
|---|---|---|---|---|---|---|---|---|---|---|
| | 0 | 1 | 2 | 3 | 4 | 5 | 6 | 7 | 8 | 9 |
| 0 | 4 | 6 | | | | 4 | 6 | | | |
| 1 | | 6 | | | 4 | | 6 | | | 4 |
| 2 | | | | 4 | | | | | 4 | |
| 3 | 4 | | | | | | | | 4 | 4 |
| 4 | | | | | | | | | 4 | 4 |
| 5 | | | | | | | | | 4 | |
| 6 | 7 | 7 | | | | 7 | 7 | | | 5 |

The sequence of transmissions depicted by block 204 is similar to that depicted in block 202, however, the HARQ-ACK/NACK indicator is depicted as being transmitted in both PDCCH and PHICH. The sequence may begin with a PUSCH transmission, depicted by PUSCH transmission bundle 222, carrying data from the UE to the eNB. PUSCH transmission bundle 222 may depict any number of repetitions of a PUSCH transmission to achieve the desired signal gain. The PUSCH transmission bundle 222 may complete transmission at time 224. Once transmission of PUSCH transmission bundle 222 completes, the eNB that receives the PUSCH transmission bundle may need a period of time to process the PUSCH transmission bundle. Such a period of time is depicted by the time period between time 224 and time 226. In some embodiments, the time period between time 224 and time 226 may be a predefined period of time (e.g. four subframes in FDD or k1 subframes in TDD, where k1 is determined in accordance with Table 1, as discussed above) to allow for scheduling of later transmissions. In other words, for FDD, if time 224 corresponds with subframe 'n,' then time 226 may, in some embodiments, correspond with subframe n+4. For TDD, time 226 may correspond with subframe n+k1, as described above.

Once PUSCH transmission bundle 222 is processed by the eNB, the eNB may send a downlink transmission to the UE including a HARQ-ACK/NACK indicator, as discussed above. In some embodiments, as depicted in block 204, the HARQ-ACK/NACK indicator may be sent to the UE via both a PDCCH transmission (e.g., PDCCH bundle 230) and a PHICH transmission (e.g., PHICH bundle 228). In some embodiments, the eNB may schedule a repetition level such that the number of PHICH repetitions in time may be equal to or less than that of the number of PDCCH repetitions in time. In such embodiments, a transmission to be scheduled after receipt of PHICH bundle 228 and PDCCH bundle 230 may be scheduled based upon the last PDCCH repetition, depicted here as occurring at time 232.

As such, in embodiments where PDCCH bundle 230 is carrying a HARQ-NACK indicator, the UE may determine a subframe in which to begin transmission of PUSCH retransmission bundle 236 to the eNB based on the last repetition of PDCCH bundle 230, which, as mentioned above, corresponds with time 232. The eNB may in turn determine the subframe in which the eNB is to begin receipt of PUSCH retransmission bundle 236 in order to know when to begin processing PUSCH retransmission bundle 220. As such, the time period between time 232 and time 234 may be a predefined period of time (e.g. four subframes in FDD or k2 subframes in TDD, where k2 is determined in accordance with Table 3, as discussed above) to allow for scheduling of the transmission of PUSCH retransmission bundle 236. In other words, for FDD, if time 232 corresponds with subframe n+4+RL, where RL is the repetition level associated with the PDCCH transmission scheduled by the eNB, then time 234 may, in some embodiments, correspond with subframe n+4+RL+4, which may be simplified to n+8+RL. For TDD, time 234 may correspond with n+k1+k2+RL, utilizing the same analysis, where k1 and k2 are determined in accordance with Table 1 and 3, respectively, as discussed above.

The sequence of transmissions depicted by block 206 is similar to that depicted in block 202 and 204; however, the HARQ-ACK/NACK indicator is depicted as being transmitted in both PDCCH and PHICH and the eNB has not scheduled the repetition level such that the number of PHICH repetitions in time is equal to or less than that of the number of PDCCH repetitions in time. The sequence may begin with a PUSCH transmission, depicted by PUSCH transmission bundle 238, carrying data from the UE to the eNB. PUSCH transmission bundle 238 may depict any number of repetitions of a PUSCH transmission to achieve the desired signal gain. The PUSCH transmission bundle 238 may complete transmission at time 240. Once transmission of PUSCH transmission bundle 238 completes, the eNB that receives PUSCH transmission bundle 238 may need a period of time to process PUSCH transmission bundle 238. Such a period of time is depicted by the time period between time 240 and time 242. In some embodiments, the time period between time 240 and time 242 may be a predefined period time (e.g. four subframes in FDD or k1 subframes in TDD, where k1 is determined in accordance with Table 1, as discussed above) to allow for scheduling of later transmissions. In other words, for FDD, if time 240 corresponds with subframe 'n,' then time 242 may, in some embodiments, correspond with subframe n+4. For TDD, time 242 may correspond with subframe n+k1, where k1 is determined in accordance with Table 1, as described above.

Once PUSCH transmission bundle 238 is processed by the eNB, the eNB may send a downlink transmission to the UE including a HARQ-ACK/NACK indicator, as discussed above. In some embodiments, as depicted in block 206, the HARQ-ACK/NACK indicator may be sent to the UE via both a PDCCH transmission (e.g., PDCCH bundle 246) and a PHICH transmission (e.g., PHICH bundle 244). In some embodiments, the repetition level of the PHICH transmission may be different from that of the repetition level of the PDCCH transmissions. In such embodiments, a transmission to be scheduled after receipt of PHICH bundle 244 and PDCCH bundle 246 may be scheduled based upon the last PDCCH repetition and the last PHICH transmission, whichever occurs later in time.

As such, in embodiments, where PDCCH bundle 246 and PHICH bundle 244 are carrying a HARQ-NACK indicator, the UE may determine a subframe in which to begin transmission of PUSCH retransmission bundle 252 to the eNB based on the last repetition of the PDCCH bundle and the PHICH bundle, which corresponds with time 248. The eNB may in turn determine the subframe in which the eNB is to begin receipt of PUSCH retransmission bundle 252 in order to know when to begin processing PUSCH retransmission bundle 252. As such, the time period between time 248 and time 250 may be a predefined period of time (e.g. four subframes in FDD or k2 subframes in TDD, where k2 is determined in accordance with Table 3, as discussed above) to allow for scheduling of the transmission of PUSCH retransmission bundle 252. In other words, for FDD, if time 248 corresponds with subframe n+4+max (PDCCH-RL, PHICH-RL), where PDCCH-RL is the repetition level associated with the PDCCH transmission and PHICH-RL is the repetition level associated with the PHICH transmission, then time 250 may, in some embodiments, correspond with subframe n+4+max(PDCCH-RL, PHICH-RL)+4, which may be simplified to n+8+max(PDCCH-RL, PHCIH-RL). For TDD time 250 may correspond with subframe n+k1+k2+max(PDCCH-RL, PHCIH-RL), utilizing the same analysis, where k1 and k2 is determined in accordance with Table 1 and 3, respectively, as discussed above.

Figure 3:
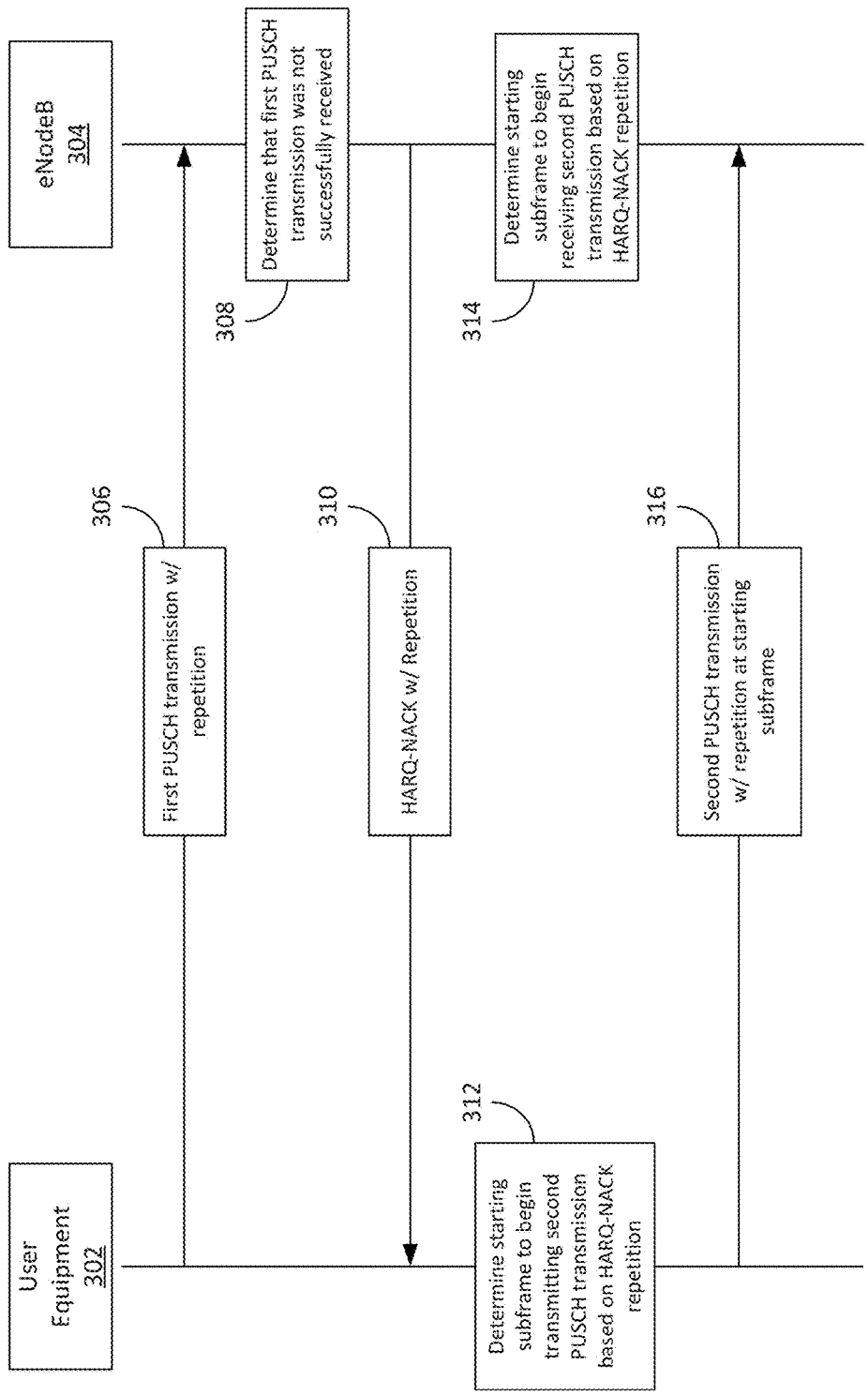
FIG. 3 is a flowchart illustrating timing selection of a physical uplink shared channel (PUSCH) retransmission in response to a negative acknowledgment (NACK) in accordance with various embodiments of the present disclosure.

FIG. 3 is a flowchart illustrating timing selection of a physical uplink shared channel (PUSCH) retransmission in response to a negative acknowledgment (NACK) in accordance with various embodiments of the present disclosure. As depicted, the flowchart may begin where user equipment (UE) 302 may send a first PUSCH transmission 306 containing data to eNodeB (eNB) 304. At 308, eNB 304 may determine that the first PUSCH transmission 306 was not successfully received and in response may transmit a HARQ-NACK indicator with repetition to achieve a desired signal gain at 310.

Upon receipt of the HARQ-NACK indicator, UE 302 may determine a starting subframe at which to begin a second PUSCH transmission containing the same data based on the HARQ-NACK repetition level. In some embodiments, such as that depicted in block 202 of FIG. 2, the HARQ-NACK indicator may be sent via a PDCCH transmission. As such, the starting subframe may be based on a level of repetition of the PDCCH transmission which may be utilized to determine a last subframe of the PDCCH transmission.

In other embodiments, such as that depicted in blocks 204 and 206 of FIG. 2, the HARQ-NACK indicator may be transmitted via both a PDCCH transmission and a PHICH transmission both at respective levels of repetition. In some embodiments, such as that depicted in block 204, eNB 304 may schedule the repetition level of the PHICH and PDCCH transmission such that the number of PHICH repetitions in time may be equal to or less than that of the number of PDCCH repetitions in time. As such, the starting subframe may be based on a level of repetition of the PDCCH transmission which may be utilized to determine a last subframe of the PDCCH transmission. In some embodiments, such as that depicted in block 206, the second PUSCH transmission may be scheduled based upon the last PDCCH repetition and the last PHICH transmission, whichever occurs later in time. Subsequently, the second PUSCH transmission 316 may be transmitted from UE 302 to eNB 304 at the determined starting subframe.

Figure 4:
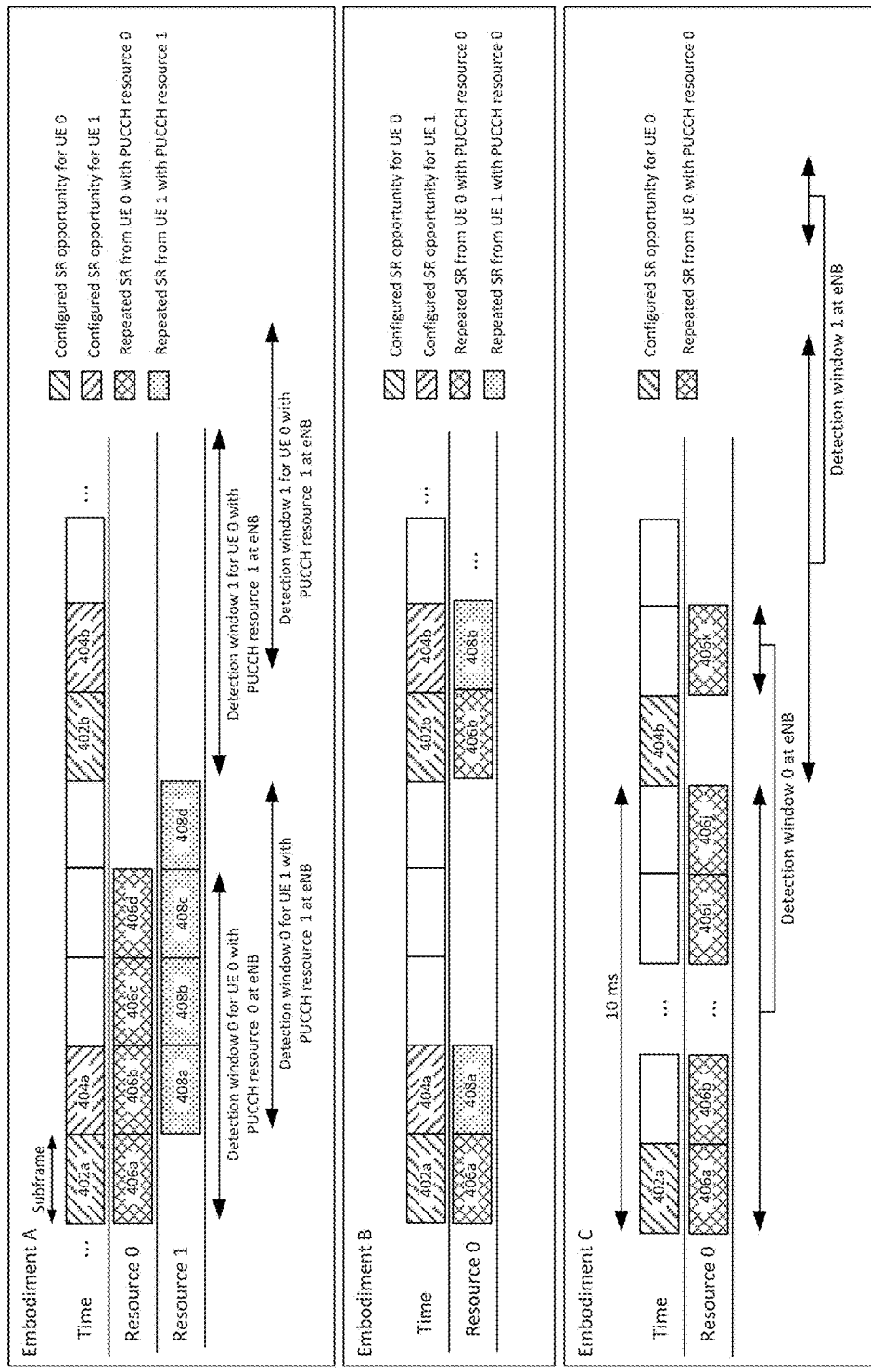
FIG. 4 illustrates timing of service request (SR) repetitions in accordance with various embodiments of the present disclosure.

FIG. 4 illustrates timing of service request repetitions in accordance with various embodiments (e.g., embodiments A-C) of the present disclosure. In some embodiments, a user equipment (UE) (e.g., UE 108 of FIG. 1) operating in an extended coverage mode may be configured to send data (e.g., a scheduling request (SR)) over a primary uplink control channel (PUCCH) transmission to an evolved node B (eNB) (e.g., eNB 104 of FIG. 1) at a predefined level of repetition. The predefined level of repetition may be selected to achieve an enhanced coverage target for the UE. An enhanced coverage target, as used herein, may refer to a desired signal gain. In order to account for the predefined level of repetition a single PUCCH resource may be scheduled, within the repetition range, for the PUCCH transmissions. Such scheduling may ensure that there are no collisions with transmissions from other UEs on the same PUCCH resource. In addition to, or in place of, scheduling the PUCCH resources, a starting subframe and/or timing scheme for the repetition of the PUCCH transmission may need to be determined. Each of the three depicted embodiments, depict the transmission of an SR in a PUCCH format 1 transmission with repetition and the horizontal axis represents time with each block representing 1 subframe.

In the current mechanism without SR repetition, the same PUCCH resources can be reused for different UEs if the configured SR opportunities (e.g., subframes) for the different UEs are different. However, with the SR repetition, the repeated SR for a UE at subframe n may collide with that for another UE at subframe n+1. Therefore, it may be desirable to have the different PUCCH resources scheduled for the different UEs, within the repetition range. Such PUCCH resources scheduling can be explicitly specified or can be handled by eNB implementation. FIG. 4 shows an example according to the embodiment that the configured SR opportunity determines the starting subframe for the repetition. In this example, eNB just needs to have two detection windows for each UE with each PUCCH resource.

Embodiment A depicts an embodiment where two UEs, UE 0 and UE 1, are both operating in an enhanced coverage mode. The enhanced coverage mode depicted may cause UE 0 and UE 1 to both transmit at a predefined repetition level, depicted here as four repetitions, to achieve the enhanced coverage target. As such, UE 0 may be scheduled to PUCCH resource 0 for the duration of the repetitions of PUCCH transmission 406a-406d and UE 1 may be scheduled to PUCCH resource 1 for the duration of the repetitions of PUCCH transmissions 408a-408d. If UE 0 and UE 1 were scheduled to utilize the same resource, then transmission collisions may begin with PUCCH transmissions 406b and 408a; however, scheduling a PUCCH resource for each UE for the duration of the repetitions may prevent such collisions from occurring. While UE 0 and UE 1 are depicted here as being at the same repetition level, it will be appreciated that this is merely for illustration and the repetition level between UE 0 and UE 1 may vary in a similar manner to that described in reference to FIG. 6 below.

As discussed above, in addition to, or in place of, scheduling the PUCCH resources, it may be desirable to designate a starting subframe and/or timing scheme for the repetition of the PUCCH transmissions. In some embodiments, such as that depicted, the starting subframe of the PUCCH transmissions may be determined based upon the configured SR opportunity. As depicted, the configured SR opportunities for UE 0 correspond with subframes 402a and 402b, while the configured SR opportunities for UE 1 correspond with subframes 404a and 404b. As can be seen, the PUCCH transmissions with repetition begin at the corresponding configured SR opportunities, 402a and 404a, for each of UE 0 and UE 1, respectively, and are repeated in consecutive subframes thereafter.

Embodiment B depicts an embodiment where two UEs, UE 0 and UE 1, again, are both operating in an enhanced coverage mode. In embodiment B, however, both UE 0 and UE 1 are scheduled to use PUCCH resource 0. In such an embodiment, instead of a single PUCCH resource being scheduled, within the repetition range, for the PUCCH transmissions of a single UE, the timing of the transmissions may be altered in an effort to prevent transmission collisions. As in embodiment A, the starting subframes, 406a and 408a, of the respective transmissions coincide with a configured SR opportunity, 402a and 404a, for the respective UEs. However, in embodiment B the transmission is repeated at consecutive subframes, 406b and 408b, that coincide with configured SR opportunities, 402b and 404b, for the respective UEs. As such, both UE 0 and UE 1 may utilize the same resource for the transmission repetitions without transmission collisions.

Embodiment C depicts only UE 0 operating in an enhanced coverage mode. As in embodiment A and B, the starting subframe, 406a of the PUCCH transmission coincides with a configured SR opportunity, 402a. However, in embodiment C the transmission is repeated at consecutive subframes, 406b-406k, except those subframes that coincide with configured SR opportunities, 404b, for the UE.

Figure 5:
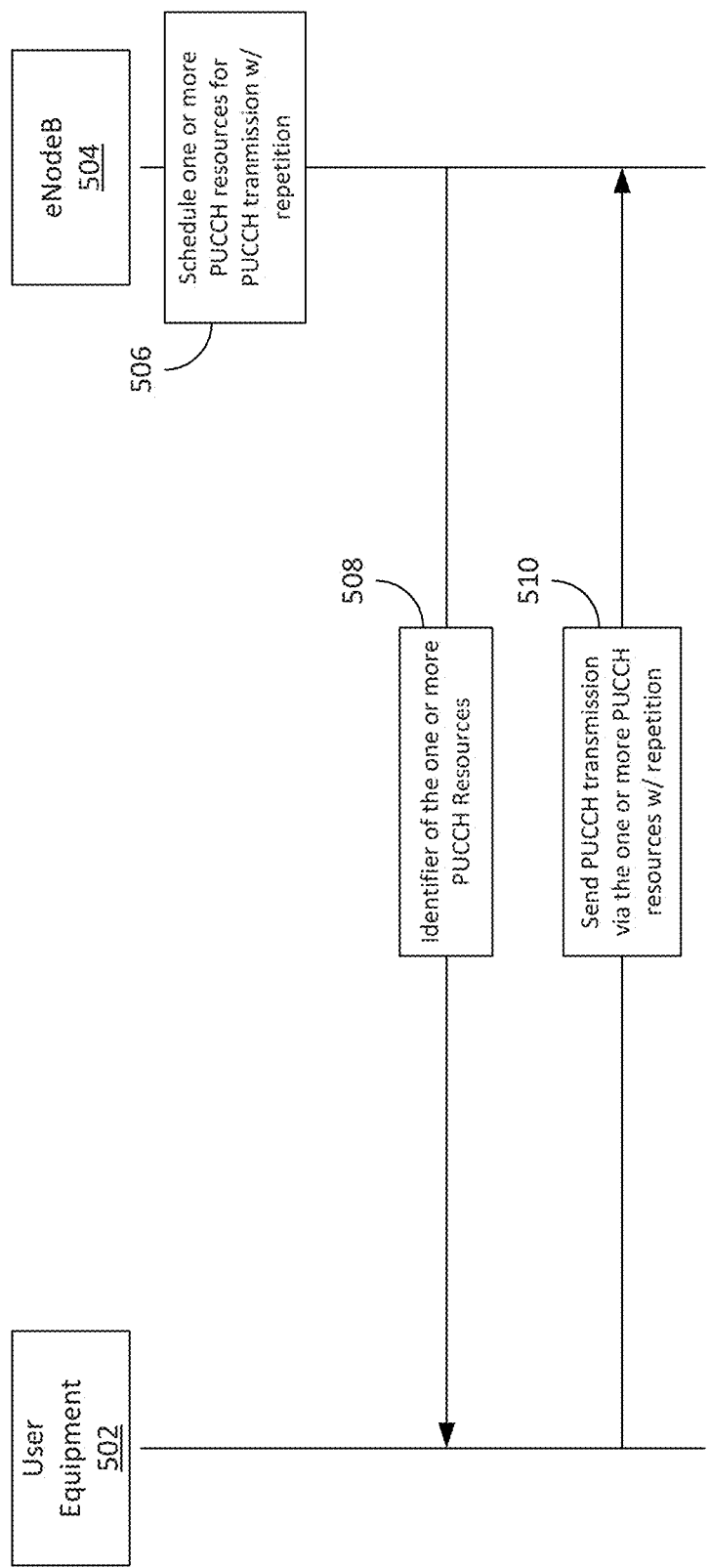
FIG. 5 is a flowchart illustrating physical uplink control channel (PUCCH) resource scheduling for a PUCCH transmission in accordance with various embodiments of the present disclosure.

FIG. 5 is a flowchart illustrating physical uplink control channel (PUCCH) resource selection for a PUCCH transmission with repetition in accordance with various embodiments of the present disclosure. The flowchart may begin at block 506 where evolved node B (eNB) 504 may schedule one or more PUCCH resources for a user equipment (UE) (e.g., UE 108 of FIG. 1) to utilize in a PUCCH transmission to an eNB 504 (e.g., eNB 104 of FIG. 1) at a predefined level of repetition associated with the UE. As discussed above, the predefined level of repetition may be selected to enable the PUCCH transmission to reach a coverage enhancement target. In some embodiments, the PUCCH transmission may be a scheduling request (SR). In other embodiments, the PUCCH transmission may be a hybrid automatic repeat request (HARD) acknowledgement/negative acknowledgment (ACK/NACK).

In embodiments, where the PUCCH transmission is an SR, the resources may be selected in a similar manner to the embodiments discussed above in reference to FIG. 4. Also as discussed above in reference to FIG. 4, it may be desirable to designate a starting subframe and/or timing scheme for the repetition of the PUCCH transmissions. In some embodiments, such a starting subframe designation and/or timing scheme may be determined by the eNB at block 506 in addition to, or in place of, scheduling the one or more PUCCH resources.

In embodiments where the PUCCH transmission is a HARQ-ACK/NACK transmission, one or more of the PUCCH resources may be implicitly derived. In some embodiments, the one or more PUCCH resources may be determined implicitly by deriving the PUCCH resource from a lowest control channel element (CCE) index of a last primary downlink control channel (PDCCH) repetition. In such embodiments, the identifier of the one or more PUCCH resources transmitted from the eNB to the UE at block 508 may be the last PDCCH repetition itself. In some embodiments, CCE locations may be configured for PDCCH repetitions (e.g., a starting CCE and an aggregation level may be configured). In such embodiments, an implicit resource may be derived from the lowest CCE index of the configuration. In other embodiments, physical resource block (PRB) locations may be configured for physical downlink shared channel (PDSCH) repetitions. In such embodiments, the lowest CCE index of a corresponding PDCCH may be derived as the implicit resource. The above discussed implicit resources may be used for the first repetition of the predefined level of repetition, for a subset of repetitions of the predefined level of repetition, or for all transmissions of the predefined level of repetition. As used herein, including the claims, CCE includes enhanced CCE (ECCE).

In some embodiments, the implicitly derived PUCCH resource may be a first PUCCH resource to be utilized for a subset of the repetitions of the predefined level of repetition and one or more additional resources may be utilized for any remaining repetitions of the predefined level of repetition. In embodiments, these one or more additional resources may be explicit resources configured by radio resource control (RRC); i.e. ($n_{PUCCH,ANRep}^{(1,\tilde{p})}$) representing the PUCCH format 1/1a/1b resource index for antenna port $\tilde{p}$ corresponding to the repeated PUCCH.

At block 508, an identifier of the one or more PUCCH resources may be transmitted to UE 502 to be utilized for the PUCCH transmission. As discussed above, where the resource is an implicit resource the identifier of the PUCCH resource may be corresponding to the lowest CCE index of the last PDCCH repetition, for example. In other embodiments, the PUCCH resource may be transmitted utilizing RRC. At block 510, UE 502 may send the PUCCH transmission via the one or more PUCCH resources with repetition. In embodiments where the PUCCH transmission is an SR the PUCCH transmission may take the form of a PUCCH format 1 transmission. In embodiments where the PUCCH transmission is a HARQ-ACK/NACK the PUCCH transmission may take the form of a PUCCH format 1a/1b transmission.

Figure 6:
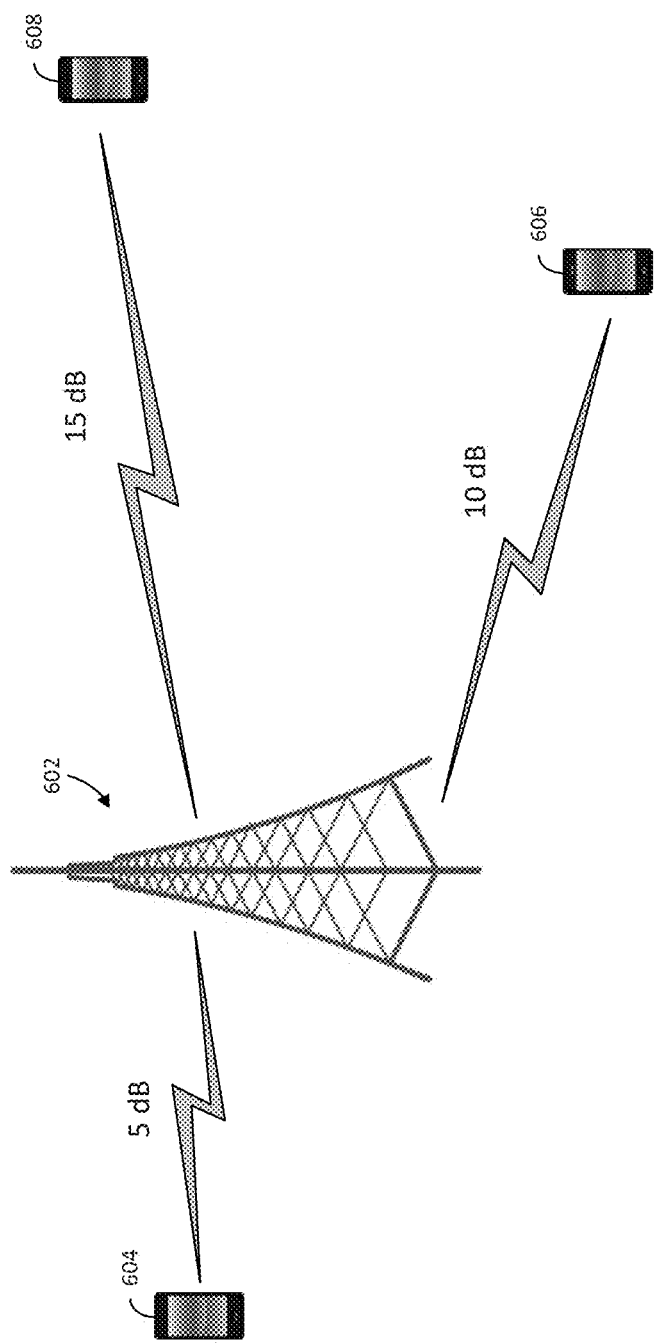
FIG. 6 illustrates a wireless communication environment having user equipments (UEs) that may need varying levels of extended coverage, in accordance with various embodiments of the present disclosure.

FIG. 6 illustrates a wireless communication environment having machine type communication (MTC) user equipments (UEs) (e.g., UE 108 of FIG. 1) that may need varying levels of extended coverage, in accordance with various embodiments of the present disclosure. In some embodiments, coverage limited UEs may need varying levels of coverage enhancement. As depicted in FIG. 6, and discussed in the examples below, the transmissions between UEs 604, 606, and 608 and evolved node B (eNB) 602 may need to meet a coverage enhancement target of 5 decibels (dBs), 10 dBs, and 15 dBs, respectively. As a result of the varying coverage enhancement targets between UEs 604-608, the number, or level, of repetitions of the various transmissions between UE 604-608 and eNB 602 may vary as well. As depicted in Table 4 below, to achieve 5 dB, 10 db, and 15 dB gains of the respective UEs 604-608, the repetition level for physical downlink control channel (PDCCH) transmissions may be 5, 10, and 80, respectively.

When enabling PDCCH/EPDCCH repetition across multiple subframes for coverage-limited MTC UEs, it may be desirable to predefine the starting subframe for PDCCH/EPDCCH transmission in order to reduce blind decoding attempts by the UE and consequently, the UE power consumption. Note, as depicted in FIG. 6, that not all the MTC UE are located in a coverage hole requiring the worst case coverage enhancement target and some MTC UEs may not need the coverage improvement. FIG. 6 illustrates an example of various coverage extension levels that MTC UEs may need.

In some embodiments, the starting subframe for the PDCCH transmission may be based on the equation $(10*n_f + k) \bmod(RL_i) = 0$, wherein k is a subframe index within a frame $n_f$, and wherein $RL_i$ is the level of repetition associated with the UE. In order to avoid radio resource waste and unnecessary UE power consumption, eNB may schedule the transmission of data and control channel according to UE specific coverage extension level. Table 4 illustrates an example of mapping rule to support three repetition levels between the PDCCH/EPDCCH repetition levels and different coverage enhancement targets. In this example, 3 PDCCH/EPDCCH repetition levels are considered, which correspond to 5 dB, 10 dB and 15 dB coverage extensions, respectively, for UE's 604-608. Different number of repetition levels and coverage enhancement targets can be straightforwardly expanded and supported based on this example.

TABLE 4

Example of mapping rule for repetition level and coverage enhancement target

| | Repetition Level for PDCCH/EPDCCH |
|---|---|
| 5 dB Extension | 5 |
| 10 dB Extension | 10 |
| 15 dB Extension | 80 |

According to this design principle, the starting subframe for PDCCH/EPDCCH UE specific search space (USS) transmission can be adjusted and defined as a function of the repetition level that coverage limited MTC UE needs. In some embodiments, eNB may schedule the first PDCCH/EPDCCH with USS in the subframe which satisfies: $(10*n_f + k) \bmod(RL_i) = 0$ Where $k = \{0, 1, 2, \ldots, 9\}$ is the subframe index within the frame $n_f$. Considering not all subframes are for DL in TDD, for instance, the index k may be counted only for the available DL subframes or special subframes in a consecutive manner. $RL_i$ is the UE specific repetition level corresponding to different coverage extension levels and $i = \{0, 1, \ldots, L-1\}$, here is the number of coverage extension levels. As shown in the example in Table 4, L=3; $RL_0=5$, $RL_1=10$ and $RL_2=80$.

In case when the potential starting subframes for coverage limited UEs are configured by higher layer signaling, the details can be as follows: The starting subframe offset and the periodicity can be signaled. In this case, the periodicity may or may not be the same as the RLs. The potential transmission for improved PDCCH/EPDCCH can be performed in the DL subframes satisfying $(10*n_f + \lfloor n_s/2 \rfloor - N_{OFFSET}) \bmod(T_{PERIODICITY}) = 0$, wherein $n_s$ is a downlink subframe slot number, $n_f$ is a radio frame index, $N_{OFFSET}$ is a subframe offset, and $T_{PERIODICITY}$ is a periodicity of signal transmission, depicted in tables 2 and 3, below.

TABLE 5

Example of mapping rule for repetition level and coverage enhancement target

| Configuration Index I | Periodicity (ms) $T_{PERIODICITY}$ | Subframe offset $N_{OFFSET}$ |
|---|---|---|
| 0-4 | 5 | I |
| 5-14 | 10 | I − 5 |
| 15-34 | 20 | I − 15 |
| 35-74 | 40 | I − 35 |
| 75-154 | 80 | I − 75 |
| 155-156 | 2 | I − 155 |
| 157 | 1 | I − 157 |

In case when the periodicity is the same as the repetition levels, the following can be considered. In table 5, $RL_0$, $RL_1$, and $RL_2$ may be 5, 10, and 80, respectively, as depicted in FIG. 6, and the example above.

TABLE 6

Example of mapping rule for repetition level and coverage enhancement target

| Configuration Index I | Periodicity (ms) $T_{PERIODICITY}$ | Subframe offset $N_{OFFSET}$ |
|---|---|---|
| 0 − ($RL_0$ − 1) | $RL_0$ | I |
| $RL_0$ − ($RL_1$ − 1) | $RL_1$ | I − $RL_0$ |

TABLE 6-continued

Example of mapping rule for repetition
level and coverage enhancement target

| Configuration Index I | Periodicity (ms) $T_{PERIODICITY}$ | Subframe offset $N_{OFFSET}$ |
|---|---|---|
| $RL_1 - (RL_2 - 1)$ | $RL_2$ | $I - RL_1$ |
| ... | ... | ... |

In addition, for PDCCH/EPDCCH with common search space (CSS) transmission, the maximum repetition level corresponding to the highest coverage extension levels can be employed in the equation above. In this regard, eNB schedules the first PDCCH/EPDCCH with CSS in the subframe which satisfies: $(10*n_f+k) \mod(RL_{L-1})=0$, where L is the number of coverage extension levels.

Note that in order to further reduce the blind decoding attempts, it may be appropriate to transmit the PDCCH/EPDCCH with same repetition level across all the repeated subframes. It may also be beneficial to preserve the same hashing function for the search space randomization.

Figure 7:
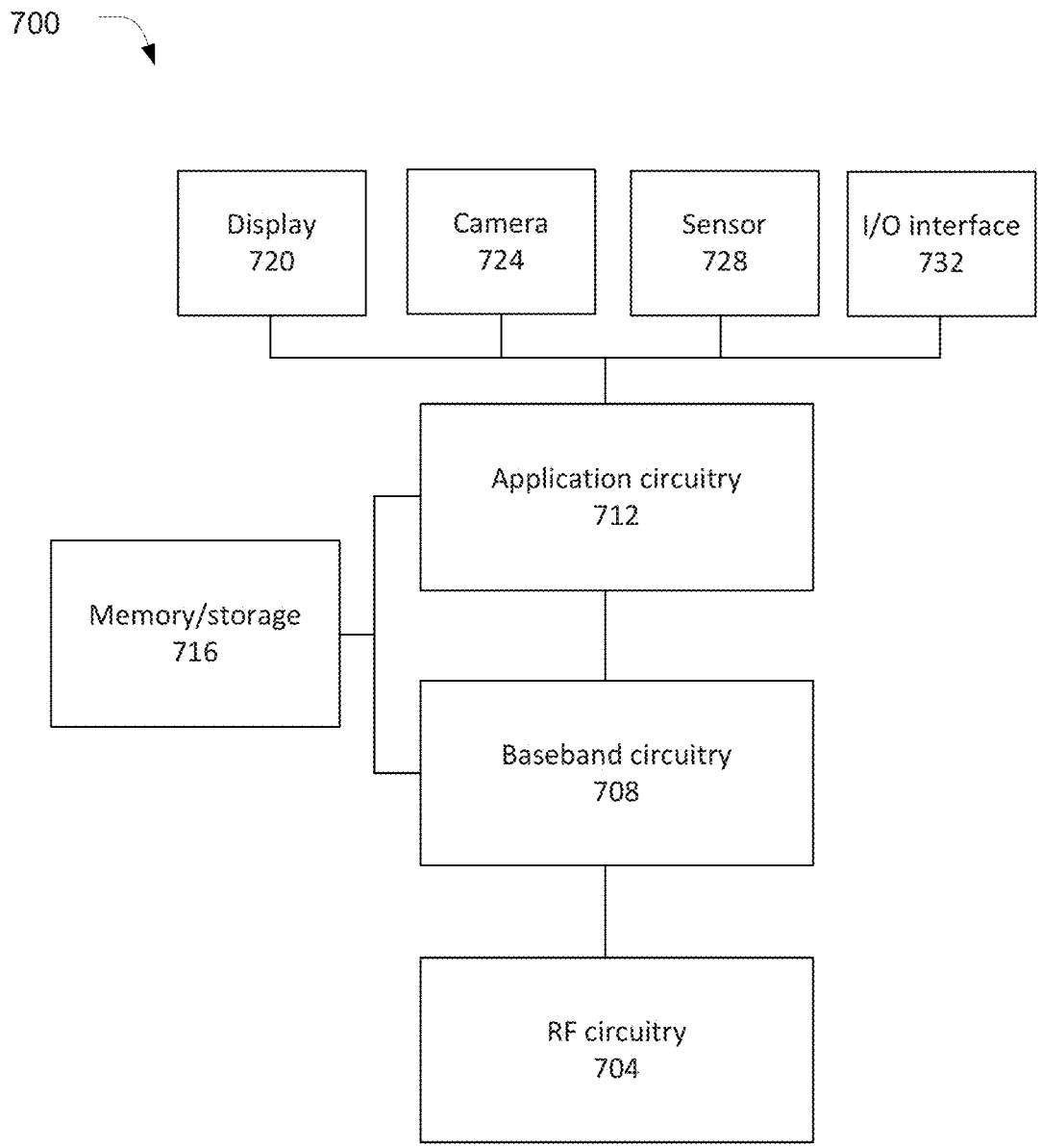
FIG. 7 is a block diagram of an example computing device that may be used to practice various embodiments described herein.

The UE 108 as described herein may be implemented into a system using any suitable hardware, firmware, and/or software configured as desired. FIG. 7 illustrates, for one embodiment, an example system 700 comprising radio frequency (RF) circuitry 704, baseband circuitry 708, application circuitry 712, memory/storage 716, display 720, camera 724, sensor 728, and input/output (I/O) interface 732, coupled with each other at least as shown.

The application circuitry 712 may include circuitry such as, but not limited to, one or more single-core or multi-core processors. The processor(s) may include any combination of general-purpose processors and dedicated processors (e.g., graphics processors, application processors, etc.). The processors may be coupled with memory/storage 716 and configured to execute instructions stored in the memory/storage 716 to enable various applications and/or operating systems running on the system 700.

The baseband circuitry 708 may include circuitry such as, but not limited to, one or more single-core or multi-core processors. The processor(s) may include a baseband processor. The baseband circuitry 708 may handle various radio control functions that enable communication with one or more radio networks via the RF circuitry 704. The radio control functions may include, but not limited to, signal modulation, encoding, decoding, radio frequency shifting, etc. In some embodiments, the baseband circuitry 708 may provide for communication compatible with one or more radio technologies. For example, in some embodiments, the baseband circuitry 708 may support communication with an E-UTRAN and/or other wireless metropolitan area networks (WMAN), a wireless local area network (WLAN), or a wireless personal area network (WPAN). Embodiments in which the baseband circuitry 708 is configured to support radio communications of more than one wireless protocol may be referred to as multi-mode baseband circuitry.

In various embodiments, baseband circuitry 708 may include circuitry to operate with signals that are not strictly considered as being in a baseband frequency. For example, in some embodiments, baseband circuitry 708 may include circuitry to operate with signals having an intermediate frequency, which is between a baseband frequency and a radio frequency.

In some embodiments, the communication circuitry 112 and/or the feedback control circuitry 132 may be embodied in the application circuitry 712 and/or the baseband circuitry 708.

RF circuitry 704 may enable communication with wireless networks using modulated electromagnetic radiation through a non-solid medium. In various embodiments, the RF circuitry 704 may include switches, filters, amplifiers, etc., to facilitate the communication with the wireless network.

In various embodiments, RF circuitry 704 may include circuitry to operate with signals that are not strictly considered as being in a radio frequency. For example, in some embodiments, RF circuitry 704 may include circuitry to operate with signals having an intermediate frequency, which is between a baseband frequency and a radio frequency.

In some embodiments, the wireless transceiver 144 may be embodied in the RF circuitry 704.

In some embodiments, some or all of the constituent components of the baseband circuitry 708, the application circuitry 712, and/or the memory/storage 716 may be implemented together on a system on a chip (SOC).

Memory/storage 716 may be used to load and store data and/or instructions, for example, for system 700. Memory/storage 716 for one embodiment may include any combination of suitable volatile memory (e.g., dynamic random access memory (DRAM)) and/or non-volatile memory (e.g., Flash memory).

In various embodiments, the I/O interface 732 may include one or more user interfaces designed to enable user interaction with the system 700 and/or peripheral component interfaces designed to enable peripheral component interaction with the system 700. User interfaces may include, but are not limited to, a physical keyboard or keypad, a touchpad, a speaker, a microphone, etc. Peripheral component interfaces may include, but are not limited to, a non-volatile memory port, a universal serial bus (USB) port, an audio jack, and a power supply interface.

In various embodiments, sensor 728 may include one or more sensing devices to determine environmental conditions and/or location information related to the system 700. In some embodiments, the sensors may include, but are not limited to, a gyro sensor, an accelerometer, a proximity sensor, an ambient light sensor, and a positioning unit. The positioning unit may also be part of, or interact with, the baseband circuitry 708 and/or RF circuitry 704 to communicate with components of a positioning network, e.g., a global positioning system (GPS) satellite.

In various embodiments, the display 720 may include a display (e.g., a liquid crystal display, a touch screen display, etc.).

In various embodiments, the system 700 may be a mobile computing device such as, but not limited to, a laptop computing device, a tablet computing device, a netbook, an ultrabook, a smartphone, etc. In various embodiments, system 700 may have more or fewer components, and/or different architectures.

EXAMPLES

The following paragraphs describe examples of various embodiments.

Example 1 includes a user equipment (UE) comprising: transceiver circuitry to: transmit, to an evolved node B (eNB), data in a first Physical Uplink Shared Channel (PUSCH) transmission; and receive, from the eNB, a Hybrid Automatic Repeat reQuest (HARQ) negative-acknowledgement (NACK) in a downlink transmission, wherein the HARQ NACK is received at a predefined or configured level of repetition across a plurality of subframes of the downlink transmission; and logic circuitry coupled with the transceiver circuitry, the logic circuitry to determine an uplink starting subframe, based on the predefined or configured level of repetition, at which to begin retransmission of the data in a second PUSCH transmission in response to the HARQ NACK.

Example 2 may include the subject matter of Example 1, wherein the logic circuitry is further to determine a downlink starting subframe at which to begin receipt of the downlink transmission based on a last subframe of the first PUSCH transmission.

Example 3 may include the subject matter of Example 2, wherein the downlink starting subframe is: four subframes after the last subframe of the first PUSCH transmission for frequency division duplex (FDD); or k1 subframes after the last subframe of the first PUSCH transmission for time division duplex (TDD), wherein k1 is selected in conjunction with a TDD uplink/downlink (UL/DL) configuration and a subframe index n in accordance with the following table:

| TDD UL/DL Configuration | subframe index n | | | | | | | | | |
|---|---|---|---|---|---|---|---|---|---|---|
| | 0 | 1 | 2 | 3 | 4 | 5 | 6 | 7 | 8 | 9 |
| 0 | | | 4 | 7 | 6 | | | 4 | 7 | 6 |
| 1 | | | 4 | 6 | | | | 4 | 6 | |
| 2 | | | 6 | | | | | 6 | | |
| 3 | | | 6 | 6 | 6 | | | | | |
| 4 | | | 6 | 6 | | | | | | |
| 5 | | | 6 | | | | | | | |
| 6 | | | 4 | 6 | 6 | | | | 4 | 7 |

Example 4 may include the subject matter of Example 1, wherein the downlink transmission is a Physical Downlink Control Channel (PDCCH) transmission, and wherein the logic circuitry is to determine the uplink starting subframe of the second PUSCH transmission based on a last subframe of the plurality of subframes of the PDCCH transmission.

Example 5 may include the subject matter of Example 4, wherein the uplink starting subframe is: four subframes after the last subframe of the PDCCH transmission for FDD; or k2 subframes after the last subframe of the downlink transmission for time division duplex (TDD), wherein k2 is selected in conjunction with a TDD uplink/downlink (UL/DL) configuration and a subframe number n in accordance with the following table:

| TDD UL/DL Configuration | subframe number n | | | | | | | | | |
|---|---|---|---|---|---|---|---|---|---|---|
| | 0 | 1 | 2 | 3 | 4 | 5 | 6 | 7 | 8 | 9 |
| 0 | 4 | 6 | | | | 4 | 6 | | | |
| 1 | | 6 | | | 4 | | 6 | | | 4 |
| 2 | | | | 4 | | | | | 4 | |
| 3 | 4 | | | | | | | 4 | 4 | |
| 4 | | | | | | | | | 4 | 4 |
| 5 | | | | | | | | | 4 | |
| 6 | 7 | 7 | | | | 7 | 7 | | | 5 |

Example 6 may include the subject matter of Example 1, wherein the downlink transmission includes a Physical HARQ Indicator Channel (PHICH) transmission and a Physical Downlink Control Channel (PDCCH) transmission, and the logic circuitry is to determine the uplink starting subframe of the second PUSCH transmission based on a last subframe of the PHICH transmission and the PDCCH transmission.

Example 7 may include the subject matter of Example 6, wherein the uplink starting subframe is four subframes after the last subframe of the downlink transmission for frequency division duplex (FDD).

Example 8 may include the subject matter of Example 6, wherein the uplink starting subframe is k2 subframes after the last subframe of the downlink transmission for time division duplex (TDD), wherein k2 is selected in conjunction with a TDD uplink/downlink (UL/DL) configuration and a subframe number n in accordance with the following table:

| TDD UL/DL Configuration | subframe number n | | | | | | | | | |
|---|---|---|---|---|---|---|---|---|---|---|
| | 0 | 1 | 2 | 3 | 4 | 5 | 6 | 7 | 8 | 9 |
| 0 | 4 | 6 | | | | 4 | 6 | | | |
| 1 | | 6 | | | 4 | | 6 | | | 4 |
| 2 | | | | 4 | | | | | 4 | |
| 3 | 4 | | | | | | | 4 | 4 | |
| 4 | | | | | | | | | 4 | 4 |
| 5 | | | | | | | | | 4 | |
| 6 | 7 | 7 | | | | 7 | 7 | | | 5 |

Example 9 may include the subject matter of Example 1, wherein the UE is a machine type communication (MTC) UE to be operated in an enhanced coverage mode, and wherein the predefined or configured level of repetition is based on an enhanced coverage requirement associated with the downlink transmission.

Example 10 may include the subject matter of Example 9, wherein the predefined or configured level of repetition is further based on an enhanced coverage requirement associated with the MTC UE.

Example 11 may include a method of determining an uplink starting subframe for physical uplink shared channel (PUSCH) transmission comprising: transmitting, by a user equipment (UE), data in a first Physical Uplink Shared Channel (PUSCH) transmission; receiving, by the UE, at a predefined or configured level of repetition across a plurality of subframes, a Hybrid Automatic Repeat reQuest (HARQ) negative-acknowledgement (NACK) in a downlink transmission in response to the first PUSCH transmission; and determining, by the UE, an uplink starting subframe, based on the predefined or configured level of repetition, at which to begin retransmission of the data in a second PUSCH transmission in response to the HARQ NACK.

Example 12 may include the subject matter of Example 11, further comprising: determining, by the UE, a downlink starting subframe at which the begin receipt of the downlink transmission based on a last subframe of the first PUSCH transmission.

Example 13 may include the subject matter of Example 12, wherein the downlink starting subframe is: four subframes after the last subframe of the first PUSCH transmission for frequency division duplex (FDD); or k1 subframes after the last subframe of the first PUSCH transmission for time division duplex (TDD), wherein k1 is selected in conjunction with a TDD uplink/downlink (UL/DL) configuration and a subframe index n in accordance with the following table:

| TDD UL/DL Configuration | subframe index n | | | | | | | | | |
|---|---|---|---|---|---|---|---|---|---|---|
| | 0 | 1 | 2 | 3 | 4 | 5 | 6 | 7 | 8 | 9 |
| 0 | | | 4 | 7 | 6 | | | 4 | 7 | 6 |
| 1 | | | 4 | 6 | | | | 4 | 6 | |

-continued

| TDD UL/DL Configuration | \multicolumn{10}{c}{subframe index n} |
|---|---|---|---|---|---|---|---|---|---|---|
|  | 0 | 1 | 2 | 3 | 4 | 5 | 6 | 7 | 8 | 9 |
| 2 |  |  | 6 |  |  |  |  | 6 |  |  |
| 3 |  |  | 6 | 6 | 6 |  |  |  |  |  |
| 4 |  |  | 6 | 6 |  |  |  |  |  |  |
| 5 |  |  | 6 |  |  |  |  |  |  |  |
| 6 |  |  | 4 | 6 | 6 |  |  |  | 4 | 7 |

Example 14 may include the subject matter of Example 11, wherein the downlink transmission is a Physical Downlink Control Channel (PDCCH) transmission, and wherein determining the uplink starting subframe is based on a last subframe of the plurality of subframes of the PDCCH transmission.

Example 15 may include the subject matter of Example 14, wherein the uplink starting subframe is: four subframes after the last subframe of the PDCCH transmission for FDD; or k2 subframes after the last subframe of the downlink transmission for time division duplex (TDD), wherein k2 is selected in conjunction with a TDD uplink/downlink (UL/DL) configuration and a subframe number n in accordance with the following table:

| TDD UL/DL Configuration | \multicolumn{10}{c}{subframe number n} |
|---|---|---|---|---|---|---|---|---|---|---|
|  | 0 | 1 | 2 | 3 | 4 | 5 | 6 | 7 | 8 | 9 |
| 0 |  |  | 4 | 6 |  |  |  | 4 | 6 |  |
| 1 |  |  |  | 6 |  | 4 |  |  | 6 |  | 4 |
| 2 |  |  |  |  | 4 |  |  |  |  | 4 |
| 3 |  | 4 |  |  |  |  |  |  | 4 | 4 |
| 4 |  |  |  |  |  |  |  |  | 4 | 4 |
| 5 |  |  |  |  |  |  |  |  | 4 |  |
| 6 |  | 7 | 7 |  |  |  | 7 | 7 |  | 5 |

Example 16 may include the subject matter of Example 11, wherein the downlink transmission is a Physical HARQ Indicator Channel (PHICH) transmission and a Physical Downlink Control Channel (PDCCH) transmission, and determining the uplink starting subframe is based on a last subframe of the PHICH transmission and the PDCCH transmission.

Example 17 may include the subject matter of Example 16, wherein the uplink starting subframe is four subframes after the last subframe of the PHICH transmission and the PDCCH transmission.

Example 18 may include the subject matter of Example 16, wherein the uplink starting subframe is k2 subframes after the last subframe of the downlink transmission for time division duplex (TDD), wherein k2 is selected in conjunction with a TDD uplink/downlink (UL/DL) configuration and a subframe number n in accordance with the following table:

| TDD UL/DL Configuration | \multicolumn{10}{c}{subframe number n} |
|---|---|---|---|---|---|---|---|---|---|---|
|  | 0 | 1 | 2 | 3 | 4 | 5 | 6 | 7 | 8 | 9 |
| 0 |  |  | 4 | 6 |  |  |  | 4 | 6 |  |
| 1 |  |  |  | 6 |  | 4 |  |  | 6 |  | 4 |
| 2 |  |  |  |  | 4 |  |  |  |  | 4 |
| 3 |  | 4 |  |  |  |  |  |  | 4 | 4 |
| 4 |  |  |  |  |  |  |  |  | 4 | 4 |
| 5 |  |  |  |  |  |  |  |  | 4 |  |
| 6 |  | 7 | 7 |  |  |  | 7 | 7 |  | 5 |

Example 19 may include the subject matter of Example 11, wherein the UE is a machine type communication (MTC) UE operating in an enhanced coverage mode, and wherein the predefined or configured level of repetition is based on an enhanced coverage requirement associated with the downlink transmission.

Example 20 may include the subject matter of Example 19, wherein the predefined or configured level of repetition is further based on an enhanced coverage requirement associated with the MTC UE.

Example 21 may include one or more non-transitory computer-readable media having instructions for determining an uplink starting subframe for physical uplink shared channel (PUSCH) transmission stored thereon, which, in response to by a user equipment (UE), cause the UE to: transmit data in a first Physical Uplink Shared Channel (PUSCH) transmission; receive, at a predefined or configured level of repetition across a plurality of subframes, a Hybrid Automatic Repeat reQuest (HARQ) negative-acknowledgement (NACK) in a downlink transmission in response to the first PUSCH transmission; and determine an uplink starting subframe, based on the predefined or configured level of repetition, at which to begin retransmission of the data in a second PUSCH transmission in response to the HARQ NACK.

Example 22 may include the subject matter of Example 21, wherein the instructions, in response to execution by the UE, further cause the UE to: determine a downlink starting subframe at which the begin receipt of the downlink transmission based on a last subframe of the first PUSCH transmission.

Example 23 may include the subject matter of Example 22, wherein the downlink starting subframe is: four subframes after the last subframe of the first PUSCH transmission for frequency division duplex (FDD); or k1 subframes after the last subframe of the first PUSCH transmission for time division duplex (TDD), wherein k1 is selected in conjunction with a TDD uplink/downlink (UL/DL) configuration and a subframe index n in accordance with the following table:

| TDD UL/DL Configuration | \multicolumn{10}{c}{subframe index n} |
|---|---|---|---|---|---|---|---|---|---|---|
|  | 0 | 1 | 2 | 3 | 4 | 5 | 6 | 7 | 8 | 9 |
| 0 |  |  |  | 4 | 7 | 6 |  |  | 4 | 7 | 6 |
| 1 |  |  |  | 4 | 6 |  |  |  | 4 | 6 |  |
| 2 |  |  | 6 |  |  |  |  | 6 |  |  |
| 3 |  |  | 6 | 6 | 6 |  |  |  |  |  |
| 4 |  |  | 6 | 6 |  |  |  |  |  |  |
| 5 |  |  | 6 |  |  |  |  |  |  |  |
| 6 |  |  | 4 | 6 | 6 |  |  |  | 4 | 7 |

Example 24 may include the subject matter of Example 23, wherein the downlink transmission is a Physical Downlink Control Channel (PDCCH) transmission, and wherein to determine the uplink starting subframe is based on a last subframe of the plurality of subframes of the PDCCH transmission.

Example 25 may include the subject matter of Example 24, wherein the uplink starting subframe is: four subframes after the last subframe of the PDCCH transmission for FDD; or k2 subframes after the last subframe of the downlink transmission for time division duplex (TDD), wherein k2 is selected in conjunction with a TDD uplink/downlink (UL/DL) configuration and a subframe number n in accordance with the following table:

| TDD UL/DL Configuration | subframe number n | | | | | | | | | |
|---|---|---|---|---|---|---|---|---|---|---|
| | 0 | 1 | 2 | 3 | 4 | 5 | 6 | 7 | 8 | 9 |
| 0 | | 4 | 6 | | | | 4 | 6 | | |
| 1 | | | 6 | | 4 | | | 6 | | 4 |
| 2 | | | | 4 | | | | | 4 | |
| 3 | 4 | | | | | | | 4 | 4 | |
| 4 | | | | | | | | 4 | 4 | |
| 5 | | | | | | | | 4 | | |
| 6 | 7 | 7 | | | | 7 | 7 | | | 5 |

Example 26 may include the subject matter of Example 21, wherein the downlink transmission is a Physical HARQ Indicator Channel (PHICH) transmission and a Physical Downlink Control Channel (PDCCH) transmission, and determining the uplink starting subframe is based on a last subframe of the PHICH transmission and the PDCCH transmission.

Example 27 may include the subject matter of Example 26, wherein the uplink starting subframe is four subframes after the last subframe of the PHICH transmission and the PDCCH transmission for FDD.

Example 28 may include the subject matter of Example 26, wherein the uplink starting subframe is k2 subframes after the last subframe of the downlink transmission for time division duplex (TDD), wherein k2 is selected in conjunction with a TDD uplink/downlink (UL/DL) configuration and a subframe number n in accordance with the following table:

| TDD UL/DL Configuration | subframe number n | | | | | | | | | |
|---|---|---|---|---|---|---|---|---|---|---|
| | 0 | 1 | 2 | 3 | 4 | 5 | 6 | 7 | 8 | 9 |
| 0 | | 4 | 6 | | | | 4 | 6 | | |
| 1 | | | 6 | | 4 | | | 6 | | 4 |
| 2 | | | | 4 | | | | | 4 | |
| 3 | 4 | | | | | | | 4 | 4 | |
| 4 | | | | | | | | 4 | 4 | |
| 5 | | | | | | | | 4 | | |
| 6 | 7 | 7 | | | | 7 | 7 | | | 5 |

Example 29 may include the subject matter of Example 21, wherein the UE is a machine type communication (MTC) UE to operate in an enhanced coverage mode, and wherein the predefined or configured level of repetition is based on an enhanced coverage requirement associated with the downlink transmission.

Example 30 may include the subject matter of Example 29, wherein the predefined or configured level of repetition is further based on an enhanced coverage requirement associated with the MTC UE.

Example 31 may include an evolved NodeB (eNB) comprising: transceiver circuitry to: receive, from a UE, data in a first Physical Uplink Shared Channel (PUSCH) transmission; and transmit, to the UE, in response to a determination that the data was not properly received, a Hybrid Automatic Repeat reQuest (HARQ) negative-acknowledgement (NACK) in a downlink transmission, wherein the HARQ NACK is transmitted at a predefined or configured level of repetition across a plurality of subframes of the downlink transmission; and logic circuitry coupled with the transceiver circuitry, the logic circuitry to determine an uplink starting subframe, based on the predefined or configured level of repetition, at which retransmission of the data in a second PUSCH transmission is to begin.

Example 32 may include the subject matter of Example 31, wherein the logic circuitry is further to determine a downlink starting subframe at which to begin transmission of the downlink transmission based on a last subframe of the first PUSCH transmission.

Example 33 may include the subject matter of Example 32, wherein the downlink starting subframe is: four subframes after the last subframe of the first PUSCH transmission for frequency division duplex (FDD); or k1 subframes after the last subframe of the first PUSCH transmission for time division duplex (TDD), wherein k1 is selected in conjunction with a TDD uplink/downlink (UL/DL) configuration and a subframe index n in accordance with the following table:

| TDD UL/DL Configuration | subframe index n | | | | | | | | | |
|---|---|---|---|---|---|---|---|---|---|---|
| | 0 | 1 | 2 | 3 | 4 | 5 | 6 | 7 | 8 | 9 |
| 0 | | | 4 | 7 | 6 | | | 4 | 7 | 6 |
| 1 | | | 4 | 6 | | | | 4 | 6 | |
| 2 | | | 6 | | | | | 6 | | |
| 3 | | | 6 | 6 | 6 | | | | | |
| 4 | | | 6 | 6 | | | | | | |
| 5 | | | 6 | | | | | | | |
| 6 | | | 4 | 6 | 6 | | | | 4 | 7 |

Example 34 may include the subject matter of Example 31, wherein the downlink transmission is a Physical Downlink Control Channel (PDCCH) transmission, and wherein the logic circuitry is to determine the uplink starting subframe of the second PUSCH transmission based on a last subframe of the plurality of subframes of the PDCCH transmission.

Example 35 may include the subject matter of Example 34, wherein the uplink starting subframe is: four subframes after the last subframe of the PDCCH transmission for FDD; or k2 subframes after the last subframe of the downlink transmission for time division duplex (TDD), wherein k2 is selected in conjunction with a TDD uplink/downlink (UL/DL) configuration and a subframe number n in accordance with the following table:

| TDD UL/DL Configuration | subframe number n | | | | | | | | | |
|---|---|---|---|---|---|---|---|---|---|---|
| | 0 | 1 | 2 | 3 | 4 | 5 | 6 | 7 | 8 | 9 |
| 0 | | 4 | 6 | | | | 4 | 6 | | |
| 1 | | | 6 | | 4 | | | 6 | | 4 |
| 2 | | | | 4 | | | | | 4 | |
| 3 | 4 | | | | | | | 4 | 4 | |
| 4 | | | | | | | | 4 | 4 | |
| 5 | | | | | | | | 4 | | |
| 6 | 7 | 7 | | | | 7 | 7 | | | 5 |

Example 36 may include the subject matter of Example 31, wherein the downlink transmission is a Physical HARQ Indicator Channel (PHICH) transmission and a Physical Downlink Control Channel (PDCCH) transmission, and the logic circuitry is to determine the uplink starting subframe based on a last subframe of the PHICH transmission and the PDCCH transmission.

Example 37 may include the subject matter of Example 36, wherein the uplink starting subframe is four subframes after the last subframe of the PHICH transmission and the PDCCH transmission.

Example 38 may include the subject matter of Example 36, wherein the uplink starting subframe is k2 subframes after the last subframe of the downlink transmission for time division duplex (TDD), wherein k2 is selected in conjunction with a TDD uplink/downlink (UL/DL) configuration and a subframe number n in accordance with the following table:

| TDD UL/DL Configuration | subframe number n | | | | | | | | | |
|---|---|---|---|---|---|---|---|---|---|---|
| | 0 | 1 | 2 | 3 | 4 | 5 | 6 | 7 | 8 | 9 |
| 0 | 4 | 6 | | | | 4 | 6 | | | |
| 1 | | 6 | | | 4 | | 6 | | | 4 |
| 2 | | | | 4 | | | | | 4 | |
| 3 | 4 | | | | | | | | 4 | 4 |
| 4 | | | | | | | | | 4 | 4 |
| 5 | | | | | | | | | 4 | |
| 6 | 7 | 7 | | | | 7 | 7 | | | 5 |

Example 39 may include a method of determining an uplink starting subframe for physical uplink shared channel (PUSCH) transmission comprising: receiving, by an evolved node B (eNB), data in a first Physical Uplink Shared Channel (PUSCH) transmission; transmitting, by the eNB, at a predefined or configured level of repetition across a plurality of subframes, a Hybrid Automatic Repeat reQuest (HARQ) negative-acknowledgement (NACK) in a downlink transmission in response to the first PUSCH transmission; and determining, by the eNB, an uplink starting subframe, based on the predefined or configured level of repetition, at which to begin receipt of the data in a second PUSCH transmission in response to the HARQ NACK.

Example 40 may include the subject matter of Example 39, further comprising: determining a downlink starting subframe at which to begin transmission of the downlink transmission based on a last subframe of the first PUSCH transmission.

Example 41 may include the subject matter of Example 40, wherein the downlink starting subframe is: four subframes after the last subframe of the first PUSCH transmission for frequency division duplex (FDD); or k1 subframes after the last subframe of the first PUSCH transmission for time division duplex (TDD), wherein k1 is selected in conjunction with a TDD uplink/downlink (UL/DL) configuration and a subframe index n in accordance with the following table:

| TDD UL/DL Configuration | subframe index n | | | | | | | | | |
|---|---|---|---|---|---|---|---|---|---|---|
| | 0 | 1 | 2 | 3 | 4 | 5 | 6 | 7 | 8 | 9 |
| 0 | | | 4 | 7 | 6 | | | 4 | 7 | 6 |
| 1 | | | 4 | 6 | | | | 4 | 6 | |
| 2 | | | 6 | | | | | 6 | | |
| 3 | | | 6 | 6 | 6 | | | | | |
| 4 | | | 6 | 6 | | | | | | |
| 5 | | | 6 | | | | | | | |
| 6 | | | 4 | 6 | 6 | | | 4 | 7 | |

Example 42 may include the subject matter of Example 39, wherein the downlink transmission is a Physical Downlink Control Channel (PDCCH) transmission, and wherein determining the uplink starting subframe of the second PUSCH transmission is based on a last subframe of the plurality of subframes of the PDCCH transmission.

Example 43 may include the subject matter of Example 42, wherein the uplink starting subframe is: four subframes after the last subframe of the PDCCH transmission; or k2 subframes after the last subframe of the downlink transmission for time division duplex (TDD), wherein k2 is selected in conjunction with a TDD uplink/downlink (UL/DL) configuration and a subframe number n in accordance with the following table:

| TDD UL/DL Configuration | subframe number n | | | | | | | | | |
|---|---|---|---|---|---|---|---|---|---|---|
| | 0 | 1 | 2 | 3 | 4 | 5 | 6 | 7 | 8 | 9 |
| 0 | 4 | 6 | | | | 4 | 6 | | | |
| 1 | | 6 | | | 4 | | 6 | | | 4 |
| 2 | | | | 4 | | | | | 4 | |
| 3 | 4 | | | | | | | | 4 | 4 |
| 4 | | | | | | | | | 4 | 4 |
| 5 | | | | | | | | | 4 | |
| 6 | 7 | 7 | | | | 7 | 7 | | | 5 |

Example 44 may include the subject matter of Example 43, wherein the downlink transmission is a Physical HARQ Indicator Channel (PHICH) transmission and a Physical Downlink Control Channel (PDCCH) transmission, and determining the uplink starting subframe is based on a last subframe of the PHICH transmission and the PDCCH transmission.

Example 45 may include the subject matter of Example 44, wherein the uplink starting subframe is four subframes after the last subframe of the PHICH transmission and the PDCCH transmission.

Example 46 may include the subject matter of Example 44, wherein the uplink starting subframe is k2 subframes after the last subframe of the downlink transmission for time division duplex (TDD), wherein k2 is selected in conjunction with a TDD uplink/downlink (UL/DL) configuration and a subframe number n in accordance with the following table:

| TDD UL/DL Configuration | subframe number n | | | | | | | | | |
|---|---|---|---|---|---|---|---|---|---|---|
| | 0 | 1 | 2 | 3 | 4 | 5 | 6 | 7 | 8 | 9 |
| 0 | 4 | 6 | | | | 4 | 6 | | | |
| 1 | | 6 | | | 4 | | 6 | | | 4 |
| 2 | | | | 4 | | | | | 4 | |
| 3 | 4 | | | | | | | | 4 | 4 |
| 4 | | | | | | | | | 4 | 4 |
| 5 | | | | | | | | | 4 | |
| 6 | 7 | 7 | | | | 7 | 7 | | | 5 |

Example 47 may include the subject matter of Example 39, wherein the predefined or configured level of repetition is based on an enhanced coverage requirement associated with the downlink transmission.

Example 48 may include one or more non-transitory computer-readable media having instructions for determining an uplink starting subframe for physical uplink shared channel (PUSCH) transmission stored thereon, which, in response to execution by an evolved node B (eNB), causes the eNB to: receive data in a first Physical Uplink Shared Channel (PUSCH) transmission; transmit, at a predefined or configured level of repetition across a plurality of subframes, a Hybrid Automatic Repeat reQuest (HARQ) negative-acknowledgement (NACK) in a downlink transmission in response to the first PUSCH transmission; and determine the uplink starting subframe, based on the predefined or configured level of repetition, at which to begin receipt of the data in a second PUSCH transmission in response to the HARQ NACK.

Example 49 may include the subject matter of Example 48, wherein the instructions, in response to execution by the eNB, further cause the eNB to: determine a downlink starting subframe at which to begin transmission of the downlink transmission based on a last subframe of the first PUSCH transmission.

Example 50 may include the subject matter of Example 49, wherein the downlink starting subframe is: four subframes after the last subframe of the first PUSCH transmission for frequency division duplex (FDD); or k1 subframes after the last subframe of the first PUSCH transmission for time division duplex (TDD), wherein k1 is selected in conjunction with a TDD uplink/downlink (UL/DL) configuration and a subframe index n in accordance with the following table:

| TDD UL/DL Configuration | subframe index n | | | | | | | | | |
|---|---|---|---|---|---|---|---|---|---|---|
| | 0 | 1 | 2 | 3 | 4 | 5 | 6 | 7 | 8 | 9 |
| 0 | | | 4 | 7 | 6 | | | 4 | 7 | 6 |
| 1 | | | 4 | 6 | | | | 4 | 6 | |
| 2 | | | 6 | | | | | 6 | | |
| 3 | | | 6 | 6 | 6 | | | | | |
| 4 | | | 6 | 6 | | | | | | |
| 5 | | | 6 | | | | | | | |
| 6 | | | 4 | 6 | 6 | | | 4 | 7 | |

Example 51 may include the subject matter of Example 38, wherein the downlink transmission is a Physical Downlink Control Channel (PDCCH) transmission, and wherein determining the uplink starting subframe of the second PUSCH transmission is based on a last subframe of the plurality of subframes of the PDCCH transmission.

Example 52 may include the subject matter of Example 51, wherein the uplink starting subframe is: four subframes after the last subframe of the PDCCH transmission; or k2 subframes after the last subframe of the downlink transmission for time division duplex (TDD), wherein k2 is selected in conjunction with a TDD uplink/downlink (UL/DL) configuration and a subframe number n in accordance with the following table:

| TDD UL/DL Configuration | subframe number n | | | | | | | | | |
|---|---|---|---|---|---|---|---|---|---|---|
| | 0 | 1 | 2 | 3 | 4 | 5 | 6 | 7 | 8 | 9 |
| 0 | 4 | 6 | | | | 4 | 6 | | | |
| 1 | | 6 | | | 4 | | 6 | | | 4 |
| 2 | | | | 4 | | | | | 4 | |
| 3 | 4 | | | | | | | 4 | 4 | |
| 4 | | | | | | | | 4 | 4 | |
| 5 | | | | | | | | | 4 | |
| 6 | 7 | 7 | | | | | 7 | 7 | | 5 |

Example 53 may include the subject matter of Example 52, wherein the downlink transmission is a Physical HARQ Indicator Channel (PHICH) transmission and a Physical Downlink Control Channel (PDCCH) transmission, and determining the uplink starting subframe is based on a last subframe of the PHICH transmission and the PDCCH transmission.

Example 54 may include the subject matter of Example 53, wherein the uplink starting subframe is four subframes after the last subframe of the PHICH transmission and the PDCCH transmission.

Example 55 may include the subject matter of Example 48, wherein the predefined or configured level of repetition is based on an enhanced coverage requirement associated with the downlink transmission.

Example 56 is an evolved node B (eNB) comprising: logic circuitry to determine a starting subframe at which transmission of data, to a user equipment (UE) in a Physical Downlink Control Channel (PDCCH) transmission, is to begin, wherein the data transmitted to the UE is to be repeated by the logic circuitry based upon a repetition level associated with the UE, and wherein the starting subframe is based, at least in part, on the repetition level associated with the UE; and transceiver circuitry coupled with the logic circuitry, the transceiver circuitry to begin transmission, to the UE, at the starting subframe, the data in the PDCCH transmission at the repetition level associated with the UE.

Example 57 may include the subject matter of Example 56, wherein the logic circuitry is to determine the starting subframe based on the equation for UE specific search space (USS): $(10*n_f+k) \mod(RL_i)=0$, wherein k is a subframe index within a frame $n_f$, and wherein $RL_i$ is the repetition level associated with the UE.

Example 58 may include the subject matter of Example 56, wherein the logic circuitry is to determine the starting subframe based on the equation for common search space (CSS): $(10*n_f+k) \mod(RL_{L-1})=0$, wherein k is a subframe index within a frame $n_f$, $RL_{L-1}$ is the repetition level associated with the UE, and L is the number of coverage extension levels.

Example 59 may include the subject matter of Example 56, wherein to the logic circuitry is to determine the starting subframe based on the equation $(10*n_f+\lfloor n_s/2 \rfloor - N_{OFFSET}) \mod(T_{PERIODICITY})=0$, wherein $n_s$ is a downlink subframe slot number, $n_f$ is a radio frame index, $N_{OFFSET}$ is a subframe offset, and $T_{PERIODICITY}$ is a periodicity of signal transmission.

Example 60 may include the subject matter of Example 56, wherein the UE is a machine type communication (MTC) UE, and wherein the repetition level associated with the MTC UE is based on a coverage enhancement target associated with the PDCCH.

Example 61 may include a method for Physical Downlink Control Channel (PDCCH) transmission comprising: determining, by an eNB, a starting subframe at which transmission of data, to a user equipment (UE) in a PDCCH transmission, is to begin, wherein the data is to be repeated based upon a repetition level associated with the UE, and wherein the starting subframe is based, at least in part, on the repetition level associated with the UE; and transmitting, to the UE, at the starting subframe, the data in the PDCCH transmission at the repetition level associated with the UE.

Example 62 may include the subject matter of Example 61, wherein determining the starting subframe is based on the equation for UE specific search space (USS): $(10*n_f+k) \mod(RL_i)=0$, wherein k is a subframe index within a frame $n_f$, and wherein $RL_i$ is the repetition level associated with the UE.

Example 63 may include the subject matter of Example 61, wherein determining the starting subframe is based on the equation for common search space (CSS): $(10*n_f+k) \mod(RL_{L-1})=0$, wherein k is a subframe index within a frame $n_f$, $RL_{L-1}$ is the repetition level associated with the UE, and L is the number of coverage extension levels.

Example 64 may include the subject matter of Example 61, wherein determining the starting subframe is based on the equation $(10*n_f+\lfloor n_s/2 \rfloor - N_{OFFSET}) \mod(T_{PERIODICITY})=0$, wherein $n_s$ is a downlink subframe slot number, $n_f$ is a radio frame index, $N_{OFFSET}$ is a subframe offset, and $T_{PERIODICITY}$ is a periodicity of signal transmission.

Example 65 may include the subject matter of Example 61, wherein the UE is a machine type communication (MTC) UE, and wherein the repetition level associated with the MTC UE is based on a coverage enhancement target associated with the PDCCH.

Example 66 may include one or more non-transitory computer-readable media having instructions for Physical Downlink Control Channel (PDCCH) transmission stored thereon, which, in response to execution by an evolved node B (eNB) cause the eNB to: determine a starting subframe at which transmission of data, to a user equipment (UE) in a PDCCH transmission, is to begin, wherein the data is to be repeated based upon a repetition level associated with the UE, and wherein the starting subframe is based, at least in part, on the repetition level associated with the UE; and transmit, to the UE, at the starting subframe, the data in the PDCCH transmission at the repetition level associated with the UE.

Example 67 may include the subject matter of Example 66, wherein to determine the starting subframe is based on the equation for UE specific search space (USS): $(10*n_f+k) \mod(RL_i)=0$, wherein k is a subframe index within a frame $n_f$, and wherein $RL_i$ is the repetition level associated with the UE.

Example 68 may include the subject matter of Example 66, wherein to determine the starting subframe is based on the equation for common search space (CSS): $(10*n_f+k) \mod(RL_{L-1})=0$, wherein k is a subframe index within a frame $n_f$, $RL_{L-1}$ is the repetition level associated with the UE, and L is the number of coverage extension levels.

Example 69 may include the subject matter of Example 66, wherein to determine the starting subframe is based on the equation $(10*n_f+\lfloor n_s/2 \rfloor - N_{OFFSET}) \mod(T_{PERIODICITY})=0$, wherein $n_s$ is a downlink subframe slot number, $n_f$ is a radio frame index, $N_{OFFSET}$ is a subframe offset, and $T_{PERIODICITY}$ is a periodicity of signal transmission.

Example 70 may include the subject matter of Example 66, wherein the UE is a machine type communication (MTC) UE, and wherein the repetition level associated with the MTC UE is based on a coverage enhancement target associated with the PDCCH.

Example 71 may include a method for receipt of a Physical Downlink Control Channel transmission comprising: determining, by a user equipment (UE), a starting subframe at which receipt of data, from an evolved node B (eNB), in a Physical Downlink Control Channel (PDCCH) transmission, is to begin, wherein the data is to be received at a predefined level of repetition associated with the UE, and wherein the starting subframe is based, at least in part, on the predefined level of repetition; and receiving, by the UE, from the eNB, the data in the PDCCH transmission at the predefined level of repetition beginning with the starting subframe.

Example 72 may include the subject matter of Example 71, wherein determining the starting subframe is based on the equation for UE specific search space (USS): $(10*n_f+k) \mod(RL_i)=0$, wherein k is a subframe index within a frame $n_f$, and wherein $RL_i$ is the predefined level of repetition associated with the UE.

Example 73 may include the subject matter of Example 71, wherein determining the starting subframe is based on the equation for common search space (CSS): $(10*n_f+k) \mod(RL_{L-1})=0$, wherein k is a subframe index within a frame $n_f$, $RL_{L-1}$ is the repetition level associated with the UE, and L is the number of coverage extension levels.

Example 74 may include the subject matter of Example 71, wherein determining the starting subframe is based on the equation:
$(10*n_f+\lfloor n_s/2 \rfloor - N_{OFFSET}) \mod(T_{PERIODICITY})=0$, wherein $n_s$ is a downlink subframe slot number, $n_f$ is a radio frame index, $N_{OFFSET}$ is a subframe offset, and $T_{PERIODICITY}$ is a periodicity of signal transmission.

Example 75 may include the subject matter of Example 71, wherein the UE is a machine type communication (MTC) UE, and wherein the level of repetition associated with the MTC UE is based on a coverage enhancement target associated with the PDCCH.

Example 76 may include one or more non-transitory computer-readable media having instructions for receipt of a Physical Downlink Control Channel transmission stored thereon, which, in response to execution by a user equipment cause the UE to: determine a starting subframe at which receipt of data, from an evolved node B (eNB), in a Physical Downlink Control Channel (PDCCH) transmission, is to begin, wherein the data is to be received at a predefined level of repetition associated with the UE, and wherein the starting subframe is based, at least in part, on the predefined level of repetition; and receive from the eNB, the data in the PDCCH transmission at the predefined level of repetition beginning with the starting subframe.

Example 77 may include the subject matter of Example 76, wherein to determine the starting subframe is based on the equation for UE specific search space (USS): $(10*n_f+k) \mod(RL_i)=0$, wherein k is a subframe index within a frame $n_f$, and wherein $RL_i$ is the predefined level of repetition associated with the UE.

Example 78 may include the subject matter of Example 76, wherein to determine the starting subframe is based on the equation for common search space (CSS): $(10*n_f+k) \mod(RL_{L-1})=0$, wherein k is a subframe index within a frame $n_f$, $RL_{L-1}$ is the repetition level associated with the UE, and L is the number of coverage extension levels.

Example 79 may include the subject matter of Example 76, wherein to determine the starting subframe is based on the equation:
$(10*n_f+\lfloor n_s/2 \rfloor - N_{OFFSET}) \mod(T_{PERIODICITY})=0$, wherein $n_s$ is a downlink subframe slot number, $n_f$ is a radio frame index, $N_{OFFSET}$ is a subframe offset, and $T_{PERIODICITY}$ is a periodicity of signal transmission.

Example 80 may include the subject matter of Example 76, wherein the UE is a machine type communication (MTC) UE, and wherein the level of repetition associated with the MTC UE is based on a coverage enhancement target associated with the PDCCH.

Example 81 may include an evolved node B (eNB) comprising: logic circuitry to schedule one or more physical uplink control channel (PUCCH) resources for a user equipment (UE) to utilize in a PUCCH transmission to the eNB at a predefined level of repetition associated with the UE; and transceiver circuitry coupled with the logic circuitry, the transceiver circuitry to: transmit an identifier of at least one of the one or more PUCCH resources to the UE; and receive the PUCCH transmission from the UE, via the one or more PUCCH resources, wherein the PUCCH transmission is received at the predefined level of repetition associated with the UE via the one or more PUCCH resources.

Example 82 may include the subject matter of Example 81, wherein the PUCCH transmission is a scheduling request (SR) in a PUCCH format 1 transmission, and wherein the one or more PUCCH resources is one PUCCH resource to be utilized for the duration of the predefined level of repetition.

Example 83 may include the subject matter of Example 82, wherein the logic circuitry is further to determine a starting subframe in which the UE is to begin transmission of the SR request in the PUCCH format 1 transmission at the predefined level of repetition.

Example 84 may include the subject matter of Example 83, wherein the starting subframe is based on a next configured SR opportunity for the UE.

Example 85 may include the subject matter of Example 84, wherein the SR is to be repeated at the predefined level of repetition in consecutive subframes of the PUCCH format 1 transmission after the starting subframe.

Example 86 may include the subject matter of Example 84, wherein the SR is to be repeated at the predefined level of repetition in consecutive subframes of the PUCCH format 1 transmission that coincide with configured SR opportunities for the UE.

Example 87 may include the subject matter of Example 84, wherein the SR is to be repeated at the predefined level of repetition in consecutive subframes of the PUCCH format 1 transmission after the starting subframe except for subframes that coincide with configured SR opportunities.

Example 88 may include the subject matter of Example 81, wherein the PUCCH transmission is a hybrid automatic repeat request (HARD) acknowledgement/negative acknowledgment (ACK/NACK) in a PUCCH format 1a/1b transmission.

Example 89 may include the subject matter of Example 88, wherein the one or more PUCCH resources includes an implicit resource derived from a lowest control channel element (CCE) index of a last PDCCH repetition.

Example 90 may include the subject matter of Example 89, wherein the one or more PUCCH resources also include an explicit resource to be utilized for a subset of PUCCH transmissions at the predefined level of repetition.

Example 91 may include the subject matter of Example 81, wherein the transceiver circuitry is further to transmit the identifier of the one or more PUCCH resources via a radio resource control (RRC) layer.

Example 92 may include a method for scheduling Physical Uplink Control Channel (PUCCH) resources comprising: scheduling, by an evolved node B (eNB), one or more PUCCH resources for a user equipment (UE) to utilize in a PUCCH transmission at a predefined level of repetition associated with the UE; transmitting an identifier of at least one of the one or more PUCCH resources to the UE; and receiving the PUCCH transmission from the UE, via the one or more PUCCH resources at the predefined level of repetition associated with the UE via the one or more PUCCH resources.

Example 93 may include the subject matter of Example 92, wherein the PUCCH transmission is a scheduling request (SR) in a PUCCH format 1 transmission, and wherein the one or more PUCCH resources is one PUCCH resource to be utilized for the duration of the predefined level of repetition.

Example 94 may include the subject matter of Example 93, further comprising: determining a starting subframe in which the UE is to begin transmission of the SR in the PUCCH format 1 transmission at the predefined level of repetition.

Example 95 may include the subject matter of Example 94, wherein determining the starting subframe is based on a next configured SR opportunity for the UE.

Example 96 may include the subject matter of Example 95, wherein the SR is to be repeated at the predefined level of repetition in consecutive subframes of the PUCCH format 1 transmission after the starting subframe.

Example 97 may include the subject matter of Example 95, wherein the SR is to be repeated at the predefined level of repetition in consecutive subframes of the PUCCH format 1 transmission that coincide with configured SR opportunities for the UE.

Example 98 may include the subject matter of Example 95, wherein the SR is to be repeated at the predefined level of repetition in consecutive subframes of the PUCCH format 1 transmission after the starting subframe except for subframes that coincide with configured SR opportunities.

Example 99 may include the subject matter of Example 92, wherein the PUCCH transmission is a hybrid automatic repeat request (HARD) acknowledgement/negative acknowledgment (ACK/NACK) in a PUCCH format 1a/1b transmission.

Example 100 may include the subject matter of Example 99, wherein the one or more PUCCH resources includes an implicit resource derived from a lowest control channel element (CCE) index of a last PDCCH repetition.

Example 101 may include the subject matter of Example 100, wherein the one or more PUCCH resources also include an explicit resource to be utilized for a subset of PUCCH transmissions at the predefined level of repetition.

Example 102 may include the subject matter of Example 92, further comprising transmitting the identifier of the one or more PUCCH resources to the UE via a radio resource control (RRC) layer.

Example 103 may include one or more non-transitory computer-readable media having instructions for scheduling a transmission one or more physical uplink control channel (PUCCH) resources which, in response to execution by an evolved node B (eNB), cause the eNB to: schedule one or more PUCCH resources for a user equipment (UE) to utilize in a PUCCH transmission to the eNB at a predefined level of repetition associated with the UE; transmit an identifier of at least one of the one or more PUCCH resources to the UE; and receive the PUCCH transmission from the UE, via the one or more PUCCH resources at the predefined level of repetition associated with the UE via the one or more PUCCH resources.

Example 104 may include the subject matter of Example 103, wherein the PUCCH transmission is a scheduling request (SR) in a PUCCH format 1 transmission, and wherein the one or more PUCCH resources is one PUCCH resource to be utilized for the duration of the predefined level of repetition.

Example 105 may include the subject matter of Example 104, wherein the instructions, in response to execution by the eNB, further cause the eNB to determine a starting subframe in which the eNB is to begin receipt of the SR in the PUCCH format 1 transmission at the predefined level of repetition.

Example 106 may include the subject matter of Example 104, wherein to determine the starting subframe is based on a next configured SR opportunity for the UE.

Example 107 may include the subject matter of Example 106, wherein the SR is to be repeated at the predefined level of repetition in consecutive subframes of the PUCCH format 1 transmission after the starting subframe.

Example 108 may include the subject matter of Example 106, wherein the SR is to be repeated at the predefined level of repetition in consecutive subframes of the PUCCH format 1 transmission that coincide with configured SR opportunities for the UE.

Example 109 may include the subject matter of Example 106, wherein the SR is to be repeated at the predefined level of repetition in consecutive subframes of the PUCCH format 1 transmission after the starting subframe except for subframes that coincide with configured SR opportunities.

Example 110 may include the subject matter of Example 103, wherein the PUCCH transmission is a hybrid automatic repeat request (HARD) acknowledgement/negative acknowledgment (ACK/NACK) in a PUCCH format 1a/1b transmission.

Example 111 may include the subject matter of Example 88, wherein the one or more PUCCH resources includes an implicit resource derived from a lowest control channel element (CCE) index of a last PDCCH repetition.

Example 112 may include the subject matter of Example 89, wherein the one or more PUCCH resources also include an explicit resource to be utilized for a subset of PUCCH transmissions at the predefined level of repetition.

Example 113 may include the subject matter of Example 103, wherein the instructions, in response to execution by the eNB further cause the eNB to: transmit the identifier of the one or more PUCCH resources to the UE via a radio resource control (RRC) layer.

Example 114 may include a user equipment (UE) comprising: transceiver circuitry to receive, from an eNB, an identifier of one or more physical uplink control channel (PUCCH) resources, to utilize in a PUCCH transmission at a predefined level of repetition associated with the UE; and logic circuitry coupled with the transceiver circuitry, the logic circuitry to cause the transceiver to transmit the PUCCH transmission, to the eNB, at the predefine level of repetition via the one or more PUCCH resources.

Example 115 may include the subject matter of Example 114, wherein the PUCCH transmission is a scheduling request (SR) in a PUCCH format 1 transmission, and wherein the one or more PUCCH resources is one PUCCH resource to be utilized for the duration of the predefined level of repetition.

Example 116 may include the subject matter of Example 115, wherein the logic circuitry is to cause the SR to be repeated, via the transceiver, at the predefined level of repetition in consecutive subframes of the PUCCH format 1 transmission after a starting subframe, wherein the starting subframe is based on a next configured SR opportunity for the UE.

Example 117 may include the subject matter of Example 115, wherein the SR is to be repeated at the predefined level of repetition in consecutive subframes of the PUCCH format 1 transmission that coincide with configured SR opportunities for the UE.

Example 118 may include the subject matter of Example 115, wherein the SR is to be repeated at the predefined level of repetition in consecutive subframes of the PUCCH format 1 transmission after the starting subframe except for subframes that coincide with configured SR opportunities.

Example 119 may include the subject matter of Example 114, wherein the PUCCH transmission is a hybrid automatic repeat request (HARD) acknowledgement/negative acknowledgment (ACK/NACK) in a PUCCH format 1a/1b transmission.

Example 120 may include the subject matter of Example 119, wherein the one or more PUCCH resources includes an implicit resource derived from a lowest control channel element (CCE) index of a last PDCCH repetition.

Example 122 may include the subject matter of Example 120, wherein the one or more PUCCH resources also include an explicit resource to be utilized for a subset of PUCCH transmissions at the predefined level of repetition.

Example 123 may include the subject matter of Example 114, wherein the transceiver circuitry is further to receive the identifier of the one or more PUCCH resources via a radio resource control (RRC) layer.

Example 124 may include a method for transmission of a scheduling request (SR) comprising: receiving, by a user equipment, from an evolved node B (eNB), an identifier of one or more PUCCH resources to utilize in a PUCCH transmission at a predefined level of repetition associated with the UE; and transmitting the PUCCH transmission, by the UE, to the eNB, at the predefine level of repetition via the PUCCH resource.

Example 125 may include the subject matter of Example 124, wherein the PUCCH transmission is a scheduling request (SR) in a PUCCH format 1 transmission, and wherein the one or more PUCCH resources is one PUCCH resource to be utilized for the duration of the predefined level of repetition.

Example 126 may include the subject matter of Example 125, further comprising: repeating, by the UE, the SR at the predefined level of repetition in consecutive subframes of the PUCCH format 1 transmission after a starting subframe, wherein the starting subframe is based on a next configured SR opportunity for the UE.

Example 127 may include the subject matter of Example 125, further comprising: repeating, by the UE, at the predefined level of repetition, in consecutive subframes of the PUCCH format 1 transmission that coincide with configured SR opportunities for the UE.

Example 128 may include the subject matter of Example 127, further comprising repeating, by the UE, at the predefined level of repetition, in consecutive subframes of the PUCCH format 1 transmission after the starting subframe except for subframes that coincide with configured SR opportunities.

Example 129 may include the subject matter of Example 124, wherein the PUCCH transmission is a hybrid automatic repeat request (HARD) acknowledgement/negative acknowledgment (ACK/NACK) in a PUCCH format 1a/1b transmission.

Example 130 may include the subject matter of Example 129, wherein the one or more PUCCH resources includes an implicit resource derived from a lowest control channel element (CCE) index of a last PDCCH repetition.

Example 132 may include the subject matter of Example 130, wherein the one or more PUCCH resources also include an explicit resource to be utilized for a subset of PUCCH transmissions at the predefined level of repetition.

Example 133 may include the subject matter of Example 124, wherein receiving the identifier of the one or more PUCCH resources is accomplished via a radio resource control (RRC) layer.

Example 134 may include one or more non-transitory computer-readable media having instructions for a physical uplink control channel (PUCCH) transmission stored thereon, wherein the instruction, in response to execution by a user equipment (UE) cause the UE to: receive, from an evolved node B (eNB), an identifier of one or more PUCCH resources to utilize in sending the PUCCH transmission at a predefined level of repetition associated with the UE; and send the PUCCH transmission, by the UE, to the eNB, at the predefined level of repetition via the PUCCH resource.

Example 135 may include the subject matter of Example 134, wherein the PUCCH transmission is a scheduling request (SR) in a PUCCH format 1 transmission, and wherein the one or more PUCCH resources is one PUCCH resource to be utilized for the duration of the predefined level of repetition.

Example 136 may include the subject matter of Example 134, wherein the instructions, in response to execution by the UE, further cause the UE to: repeat the SR at the predefined level of repetition in consecutive subframes of the PUCCH format 1 transmission after a starting subframe, wherein the starting subframe is based on a next configured SR opportunity for the UE.

Example 137 may include the subject matter of Example 134, wherein the instructions, in response to execution by the UE, further cause the UE to: repeat the SR at the predefined level of repetition in consecutive subframes of the PUCCH format 1 transmission that coincide with configured SR opportunities for the UE.

Example 138 may include the subject matter of Example 134, wherein the instructions, in response to execution by the UE, further cause the UE to: repeat the SR at the predefined level of repetition in consecutive subframes of the PUCCH format 1 transmission after the starting subframe except for subframes that coincide with configured SR opportunities.

Example 139 may include the subject matter of Example 134, wherein the PUCCH transmission is a hybrid automatic repeat request (HARD) acknowledgement/negative acknowledgment (ACK/NACK) in a PUCCH format 1a/1b transmission.

Example 140 may include the subject matter of Example 139, wherein the one or more PUCCH resources includes an implicit resource derived from a lowest control channel element (CCE) index of a last PDCCH repetition.

Example 141 may include the subject matter of Example 140, wherein the one or more PUCCH resources also include an explicit resource to be utilized for a subset of PUCCH transmissions at the predefined level of repetition.

Example 142 may include the subject matter of Example 134, wherein to receive the identifier of the one or more PUCCH resources is accomplished via a radio resource control (RRC) layer.

The description herein of illustrated implementations, including what is described in the Abstract, is not intended to be exhaustive or to limit the present disclosure to the precise forms disclosed. While specific implementations and examples are described herein for illustrative purposes, various equivalent modifications are possible within the scope of the disclosure, as those skilled in the relevant art will recognize. These modifications may be made to the disclosure in light of the above detailed description.

What is claimed is:

1. A user equipment (UE) comprising:
transceiver circuitry to:
transmit, to an evolved node B (eNB), data in a first bundle of repeated Physical Uplink Shared Channel (PUSCH) transmissions; and
receive, from the eNB, a Hybrid Automatic Repeat reQuest (HARQ) negative-acknowledgement (NACK) in a Physical Downlink Control Channel (PDCCH) transmission, wherein the HARQ NACK from the eNB to the UE in response to the data in the first bundle of repeated PUSCH transmissions is received multiple times at a predefined or configured level of repetition across a plurality of subframes of the PDCCH transmission; and
logic circuitry coupled with the transceiver circuitry, the logic circuitry to determine an uplink starting subframe, based on the predefined or configured level of repetition, at which to begin retransmission of the data in a second PUSCH transmission in response to the HARQ NACK, and further to determine a downlink starting subframe at which to begin receipt of the PDCCH transmission of HARQ NACK for multiple times, based on a last subframe of the first bundle of repeated PUSCH transmissions.

2. The UE of claim 1, wherein the downlink starting subframe is:
four subframes after the last subframe of the first bundle of repeated PUSCH transmission for frequency division duplex (FDD); or
k1 subframes after the last subframe of the first PUSCH transmission for time division duplex (TDD), wherein k1 is selected in conjunction with a TDD uplink/downlink (UL/DL) configuration and a subframe index n in accordance with the following table:

| TDD UL/DL Configuration | subframe index n | | | | | | | | | |
|---|---|---|---|---|---|---|---|---|---|---|
| | 0 | 1 | 2 | 3 | 4 | 5 | 6 | 7 | 8 | 9 |
| 0 | | | 4 | 7 | 6 | | | 4 | 7 | 6 |
| 1 | | | 4 | 6 | | | | 4 | 6 | |
| 2 | | | 6 | | | | | 6 | | |
| 3 | | | 6 | 6 | 6 | | | | | |
| 4 | | | 6 | 6 | | | | | | |
| 5 | | | 6 | | | | | | | |
| 6 | | | 4 | 6 | 6 | | | 4 | 7. | |

3. The UE of claim 1, wherein the uplink starting subframe is:
four subframes after the last subframe of the PDCCH transmission for frequency division duplex (FDD); or
k2 subframes after the last subframe of a downlink transmission for time division duplex (TDD), wherein k2 is selected in conjunction with a TDD uplink/downlink (UL/DL) configuration and a subframe number n in accordance with the following table:

| TDD UL/DL Configuration | subframe number n | | | | | | | | | |
|---|---|---|---|---|---|---|---|---|---|---|
| | 0 | 1 | 2 | 3 | 4 | 5 | 6 | 7 | 8 | 9 |
| 0 | 4 | 6 | | | | 4 | 6 | | | |
| 1 | | 6 | | | 4 | | 6 | | | 4 |
| 2 | | | | | 4 | | | | 4 | |
| 3 | 4 | | | | | | | | 4 | 4 |
| 4 | | | | | | | | | 4 | 4 |
| 5 | | | | | | | | | 4 | |
| 6 | 7 | 7 | | | | | 7 | 7 | | 5. |

4. The UE of claim 1, wherein the transceiver circuitry is further to receive a Physical HARQ Indicator Channel (PHICH) transmission of HARQ NACK in addition to the Physical Downlink Control Channel (PDCCH) transmission of HARQ NACK, and the logic circuitry is to determine the uplink starting subframe of the second PUSCH transmission based on a last subframe of the PHICH transmission and the PDCCH transmission.

5. The UE of claim 4, wherein the uplink starting subframe is four subframes after the last subframe of a downlink transmission for frequency division duplex (FDD).

6. The UE of claim 4, wherein the uplink starting subframe is k2 subframes after the last subframe of the downlink transmission for time division duplex (TDD), wherein k2 is selected in conjunction with a TDD uplink/downlink (UL/DL) configuration and a DL subframe number n in accordance with the following table:

| TDD UL/DL Configuration | \multicolumn{10}{c}{subframe number n} |
|---|---|---|---|---|---|---|---|---|---|---|

| TDD UL/DL Configuration | 0 | 1 | 2 | 3 | 4 | 5 | 6 | 7 | 8 | 9 |
|---|---|---|---|---|---|---|---|---|---|---|
| 0 | 4 | 6 | | | | 4 | 6 | | | |
| 1 | | 6 | | | 4 | | 6 | | | 4 |
| 2 | | | | 4 | | | | | 4 | |
| 3 | 4 | | | | | | | | 4 | 4 |
| 4 | | | | | | | | | 4 | 4 |
| 5 | | | | | | | | | 4 | |
| 6 | 7 | 7 | | | | 7 | 7 | | | 5. |

7. The UE of claim 1, wherein the UE is a machine type communication (MTC) UE to be operated in an enhanced coverage mode, and wherein the predefined or configured level of repetition is based on an enhanced coverage requirement associated with a downlink transmission.

8. The UE of claim 7, wherein the predefined or configured level of repetition is further based on an enhanced coverage requirement associated with the MTC UE.

* * * * *